US007218976B2

(12) United States Patent
Minagawa

(10) Patent No.: US 7,218,976 B2
(45) Date of Patent: May 15, 2007

(54) USER INTERFACE CONTROL APPARATUS AND METHOD

(75) Inventor: Tomonori Minagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 892 days.

(21) Appl. No.: 10/125,379

(22) Filed: Apr. 19, 2002

(65) Prior Publication Data

US 2002/0161936 A1   Oct. 31, 2002

(30) Foreign Application Priority Data

Apr. 27, 2001 (JP) ............................. 2001-132928
Apr. 27, 2001 (JP) ............................. 2001-132929

(51) Int. Cl.
*G05B 11/32* (2006.01)
*G06F 3/00* (2006.01)
*G06F 17/50* (2006.01)
*G06F 13/00* (2006.01)
*G06F 9/44* (2006.01)
*G06F 9/46* (2006.01)
*G06F 7/48* (2006.01)
*G06F 7/60* (2006.01)

(52) U.S. Cl. .................. 700/67; 710/1; 703/1; 719/318
(58) Field of Classification Search .................. 700/67; 710/1; 719/318
See application file for complete search history.

(56) References Cited

U.S. PATENT DOCUMENTS

| 5,159,597 A | 10/1992 | Monahan et al. ........... 371/16.1 |
| 5,500,715 A | 3/1996 | Ta et al. ......................... 399/1 |
| 5,708,798 A * | 1/1998 | Lynch et al. .................... 703/1 |
| 5,899,985 A | 5/1999 | Tanaka ........................ 706/45 |
| 5,943,673 A | 8/1999 | Felouzis et al. ............. 707/104 |
| 5,978,559 A | 11/1999 | Quinion ...................... 395/114 |
| 5,999,945 A | 12/1999 | Lahey .......................... 707/200 |
| 6,024,505 A | 2/2000 | Shinohara .................... 400/605 |
| 6,388,687 B1 | 5/2002 | Brackett ...................... 345/810 |
| 6,407,760 B1 | 6/2002 | Aritomi ....................... 345/810 |
| 6,563,519 B1 | 5/2003 | Minagawa .................. 345/764 |
| 6,614,550 B1 | 9/2003 | Minagawa ................. 358/1.15 |

(Continued)

FOREIGN PATENT DOCUMENTS

EP   0 588 513   3/1994

(Continued)

OTHER PUBLICATIONS

Japanese Final Rejection, dated Aug. 14, 2006 for Japanesse Application No. 2001-132928 with English translation.

*Primary Examiner*—Anthony Knight
*Assistant Examiner*—Sunray Chang
(74) *Attorney, Agent, or Firm*—Fitzpatrick, Cella, Harper & Scinto

(57) ABSTRACT

An identifier which indicates a reason why a direct change is disabled upon application of a specific conflict resolution rule can be described in a conflict resolution rule description file (301). In case of a process executed when a UI is not displayed, a status variable list (304) that holds setup values and status values is accessed in place of an internal structure (305) to easily check if each setup item is enabled/disabled. Upon matching overall data, a start point list which lists setup items in a given priority order is loaded to execute conflict resolution in turn, thus resolving conflicts among setup items.

31 Claims, 18 Drawing Sheets

U.S. PATENT DOCUMENTS 6,662,235 B1 * 12/2003 Callis et al. ................. 719/318
2002/0065807 A1 * 5/2002 Kawamoto et al. ............. 707/1

FOREIGN PATENT DOCUMENTS

| EP | 0 637 157 | 2/1995 |
| JP | 64-046840 | 2/1989 |
| JP | 2-197862 | 8/1990 |
| JP | 04-251871 | 9/1992 |
| JP | 06-035647 | 3/1994 |
| JP | 06-059846 | 3/1994 |
| JP | 07-044477 | 2/1995 |
| JP | 07-311670 | 11/1995 |
| JP | 09-054671 | 2/1997 |
| JP | 09-138743 | 5/1997 |
| JP | 9-198191 | 7/1997 |
| JP | 10-049318 | 2/1998 |
| JP | 2000-227847 | 2/1999 |
| JP | 11-126129 A | 5/1999 |
| JP | 2000-127565 | 5/2000 |
| JP | 2000-276010 | 10/2000 |
| JP | 2001-027944 | 1/2001 |
| JP | 2001-195166 | 7/2001 |
| JP | 2002-196905 | 7/2002 |
| WO | WO 00/03340 | 1/2000 |

* cited by examiner

FIG. 6

Staple(OFF) ← Finisher(OFF).   (1)
    {disable}
    {Reason(NO_FINISHER)}

Staple(OFF) ← StaplablePaper(OFF).   (2)
    {disable}
    {Reason(INVALID_PAPER)}

Staple(OFF) ← Layout(BOOKLET).   (3)
    {disable}
    {Reason(INVALID_LAYOUT)}

Staple(OFF) ← PaperType(OHP).   (4)
    {disable}
    {Reason(INVALID_PAPERTYPE)}

Staple(OFF) ← Collate(ON).   (5)

Staple(OFF) ← Group(ON).   (6)

Collate(ON) ← Layout(BOOKLET).   (7)
    {disable}

Group(OFF) ← Layout(BOOKLET).   (8)
    {disable}
    :

FIG. 7

| int | cLayout | 1Sided |
|---|---|---|
| int | cCollate | 0 |
| int | cGroup | 1 |
| int | cStaple | 0 |
| BOOL | bFinisher | TRUE |

| KEY | STATE | USE OF CONTROL | DISABLE REASON | NECESSITY OF UI UPDATE |
|---|---|---|---|---|
| Collate | ON | disable | × | yes |
| Group | OFF | disable | × | yes |
| Staple | OFF | disable | INVALID_PAPER | yes |
| Layout | BOOKLET | able | | yes |
| ... | | | | |

FIG. 12

Staple(OFF) ← Layout(BOOKLET).    (1)
    {disable}

Staple(OFF) ← Collate(ON).    (2)

Staple(OFF) ← Group(ON).    (3)

Collate(ON) ← Layout(BOOKLET).    (4)
    {disable}

Group(OFF) ← Layout(BOOKLET).    (5)
    {disable}

| int | cLayout | 1Sided |
| --- | --- | --- |
| int | cCollate | 0 |
| int | cGroup | 1 |
| int | cStaple | 0 |
| | ⋮ | |

FIG. 16

| int | cLayout | Booklet |
| --- | --- | --- |
| int | cCollate | 1 |
| int | cGroup | 0 |
| int | cStaple | 0 |
| | ⋮ | |

FIG. 17

Layout

Collate

Group

Staple

:

USER INTERFACE CONTROL APPARATUS AND METHOD

FIELD OF THE INVENTION

The present invention relates to a user interface control apparatus and method for resolving conflicts between setup data for a predetermined object to be controlled, which are input via a user interface.

BACKGROUND OF THE INVENTION

There are many apparatuses which accept a plurality of setup values input from the user via a user interface (to be also referred to as a "UI" hereinafter) and are controlled based on these setup values. An example of such apparatus is an image forming system (printer system) which is connected to a host computer, and executes an image forming process based on information set by the host computer. The host computer of the printer system normally has a so-called printer driver for controlling a print process, and a print process related program including a UI that accepts a print setup and the like from the user.

Every time a setup value input from the user is accepted via the UI, the print process related program evaluates the relationship between the input setup value and an associated one of a plurality of setup values set so far, and checks if conflicts occur between the setup values. Examples of conflicts include a setup disadvantageous for the user (e.g., a setup of a two-sided print process for an OHP sheet set as a print medium), a setup that tries to make a printer execute impossible operations, and the like.

If any conflicts are found, conflict resolution for resolving such conflicts must be executed.

In a conventional method, a plurality of setup value conditions (conflict resolution rules) that require conflict resolution are saved as a list in, e.g., a file, and conflict resolution is executed by loading that file by a conflict resolution program. Such method is better since the conflict resolution program can be versatilely used independently of a specific setup value.

Some conflict resolution executes a process for informing the user of not only a change in setup value in a data structure but also a change in setup value on the control of the UI (to be also simply referred to as "control" hereinafter), and a process for informing the user that a given setup item cannot be directly changed (by, e.g., a mouse) by graying out a control (displaying the setup item in light gray).

As a result of the conflict resolution including such process, the user can recognize that a control which is inhibited from being used depending on another item cannot be directly changed, since that control is grayed out, but he or she cannot easily understand a cause of denial of the direct change (e.g., the other item with dependency) if such cause is present on another one of a plurality of sheets and dialog boxes. To solve this problem, some program displays a message that contains a reason why the direct change of the control is denied near the grayed-out control.

Conventionally, in order to display the reason why a direct change of a grayed-out control is denied, a dedicated reason detect program must be prepared in addition to a description of the conflict resolution. In order to accurately detect a reason, program codes of reason detect processes corresponding to processes for graying out a control are required. Preparation of such program codes requires much labor, and upon adding/changing grayout processes, reason detect processes readily encounter errors or inconsistency.

Also, a plurality of reasons for graying out a given control are often present (for example, that control cannot be used unless a specific device option (e.g., a staple finisher) is attached, and the control has an exclusive relationship with another item). In such case, the reason detect processes become more complicated, and the aforementioned problem upon preparing for the program becomes more conspicuous.

In some cases, setup values of an internal structure which saves setups on the user interface may be directly changed by another program without the intervention of the user interface (i.e., without displaying the user interface). In such case, conflicts with items associated with the changed setup values must be evaluated, and the same conflict resolution as that executed when the user changes them via the user interface must be executed.

Upon changing the setups of a device or during link processes to an application, the consistency of setups in the internal structure may be lost. Upon opening the user interface or before a print process is executed, a matching process for overall data is required. In such case, the same matching process results as those obtained when the user makes operation by opening the user interface must be obtained.

Both the conflict resolution and the matching process for overall data executed when the user interface is not displayed use the same conflict resolution rules. Hence, a conflict resolution module may be divided into a data processing module and user interface processing module, and only the data processing module may be used when the user interface is not displayed.

However, in a process executed when the user interface is not displayed, even an item, which cannot be directly changed since it is grayed out (a setup item is displayed in light gray) while the user interface is displayed, may undergo an inadvertent change process upon generation of a change request event. For this reason, it is difficult to use a common processing module.

The matching process for overall data must be done under a different precondition. That is, when the user interface is displayed, matching with an associated item is evaluated to have as a start point an item whose setup has been changed, and if an update process is required, matching with the next associated item is evaluated. However, in case of the process for entire data, there is no start point upon changing the setup, and overall check is required. Hence, it is difficult to use a common processing module.

However, if these processes are implemented as independent modules, independent processing codes must be created although they have nearly the same algorithms. In addition, upon adding or changing the conflict detect processes, respective processes may readily encounter errors or inconsistency.

SUMMARY OF THE INVENTION

The present invention has been made in consideration of the above problems, and has as its object to provide a user interface control apparatus and method, which can implement a function of displaying a reason why setup of a specific item on the user interface is denied without causing any reason detect errors or inconsistency, and can reduce the number of input steps and contrived errors by a developer.

It is another object of the present invention to provide a low-cost, high-quality user interface control apparatus and method, which allow conflict resolution for data input without the intervention of the user interface and a matching process for overall data to commonly use a module that executes conflict resolution for data input via the user interface so as to obviate the need for preparing for dedicated conflict resolution modules for respective processes.

According to the present invention, the foregoing object is attained by providing a user interface control apparatus for resolving a conflict between a plurality of pieces of setup information input to a predetermined apparatus to be controlled via a user interface and/or a plurality of pieces of environment information of the apparatus to be controlled, comprising: holding means for holding conflict resolution rules to be applied in accordance with the setup information and/or the environment information; status control means for controlling to enable/disable a direct change in state of a predetermined setup item on the user interface in accordance with the conflict resolution rules; and message control means for sending a message containing a reason why the direct change in state of the predetermined setup item is disabled by the status control means via the user interface, wherein: the conflict resolution rules containing: a command for disabling the direct change in state of the predetermined setup item; and reason information indicating a reason why the direct change is disabled by the command.

According to the another aspect of the present invention, the foregoing object is attained by providing a user interface control method for resolving a conflict between a plurality of pieces of setup information input to a predetermined apparatus to be controlled via a user interface, and/or a plurality of pieces of environment information of the apparatus to be controlled, comprising the steps of: controlling to enable/disable a direct change in state of a predetermined setup item on the user interface in accordance with conflict resolution rules to be applied in accordance with the setup information and/or the environment information, wherein the conflict resolution rules containing a command for disabling the direct change in state of the predetermined setup item, and reason information indicating a reason why the direct change is disabled by the command; and sending a message corresponding to the reason information contained in the applied conflict resolution rule via the user interface.

In still another aspect of the present invention, the foregoing object is attained by providing a control program for resolving a conflict between a plurality of pieces of setup information input to a predetermined apparatus to be controlled via a user interface, and/or a plurality of pieces of environment information of the apparatus to be controlled, executing: a step of controlling to enable/disable a direct change in state of a predetermined setup item on the user interface in accordance with conflict resolution rules to be applied in accordance with the setup information and/or the environment information, wherein the conflict resolution rules containing a command for disabling the direct change in state of the predetermined setup item, and reason information indicating a reason why the direct change is disabled by the command; and a step of sending a message according to the reason information contained in the applied conflict resolution rule via the user interface.

In still another aspect of the present invention, the foregoing object is attained by providing a user interface control apparatus, which comprises first input means for inputting a setup change request to a predetermined apparatus to be controlled via a user interface, and second input means for inputting a setup change request to the apparatus to be controlled without the intervention of the user interface, and resolves a conflict between setup states of setup items on the user interface, comprising: a first storage area for storing setup information indicating the setup state of each setup item on the user interface, and information indicating whether or not a direct change of the setup state is enabled; a second storage area for storing an internal structure of the user interface by reflecting the setup information of each setup item in the first storage area; a third storage area for storing predetermined conflict resolution rules to be applied to the setup change request input by the first or second input means; checking means for checking if the information, which indicates whether or not the direct change is enabled, and is stored in the first storage area in correspondence with the setup item to be changed by the setup change request, indicates that the direct change is enabled; and change means for, when the checking means determines that the information, which indicates whether or not the direct change is enabled, and is stored in the first storage area in correspondence with the setup item to be changed by the setup change request, indicates that the direct change is enabled, changing the setup information and/or the information indicating whether or not the direct change is enabled, of the specific setup item, which are/is stored in the first storage area.

In still another aspect of the present invention, the foregoing object is attained by providing a user interface control method for resolving a conflict between setup states of setup items on a user interface used to set up a predetermined apparatus to be controlled, comprising: a first input step of inputting a setup change request to the apparatus to be controlled via the user interface; a second input step of inputting a setup change request to the apparatus to be controlled without the intervention of the user interface; a checking step of checking if information, which is stored in a status variable list that stores setup information indicating the setup state of each setup item on the user interface, and information indicating whether or not a direct change of the setup state is enabled, corresponds to the setup item to be changed by the setup change request, and indicates whether or not the direct change of the setup state is enabled, indicates that the direct change is enabled; and an update state of updating, when it is determined in the checking step that the information, which corresponds to the setup item to be changed by the setup change request and indicates whether or not the direct change of the setup state is enabled, indicates that the direct change is enabled, the setup information and/or the information indicating whether or not the direct change is enabled, of the specific setup item stored in the status variable list in accordance with a conflict resolution rule to be applied according to the setup change request input in the first or second input step.

In still another aspect of the present invention, the foregoing object is attained by providing a control program for resolving a conflict between setup states of setup items on a user interface used to set up a predetermined apparatus to be controlled, executing: a first input step of inputting a setup change request to the apparatus to be controlled via the user interface; a second input step of inputting a setup change request to the apparatus to be controlled without the intervention of the user interface; a checking step of checking if information, which is stored in a status variable list that stores setup information indicating the setup state of each setup item on the user interface, and information indicating whether or not a direct change of the setup state is enabled, corresponds to the setup item to be changed by the setup change request, and indicates whether or not the direct change of the setup state is enabled, indicates that the direct change is enabled; and an update state of updating, when it is determined in the checking step that the information, which corresponds to the setup item to be changed by the setup change request and indicates whether or not the direct change of the setup state is enabled, indicates that the direct change is enabled, the setup information and/or the information indicating whether or not the direct change is enabled, of the specific setup item stored in the status variable list in accordance with a conflict resolution rule to be applied according to the setup change request input in the first or second input step.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 6 shows an example of a conflict resolution rule description file in the first embodiment of the present invention;

FIG. 7 shows an example of an internal structure in the first embodiment of the present invention;

FIG. 11 shows an example of a status variable list in the first embodiment of the present invention;

FIG. 12 shows an example of a conflict resolution rule description file in the second embodiment of the present invention;

FIG. 14 shows an example of an internal structure in the second embodiment of the present invention;

FIG. 16 shows an example of an internal structure in the second embodiment of the present invention;

FIG. 17 shows an example of a start point list in the second embodiment of the present invention.

DESCRIPTION OF THE PREFERRED EMBODIMENTS

First Embodiment (Hardware Arrangement)

Figure 1:
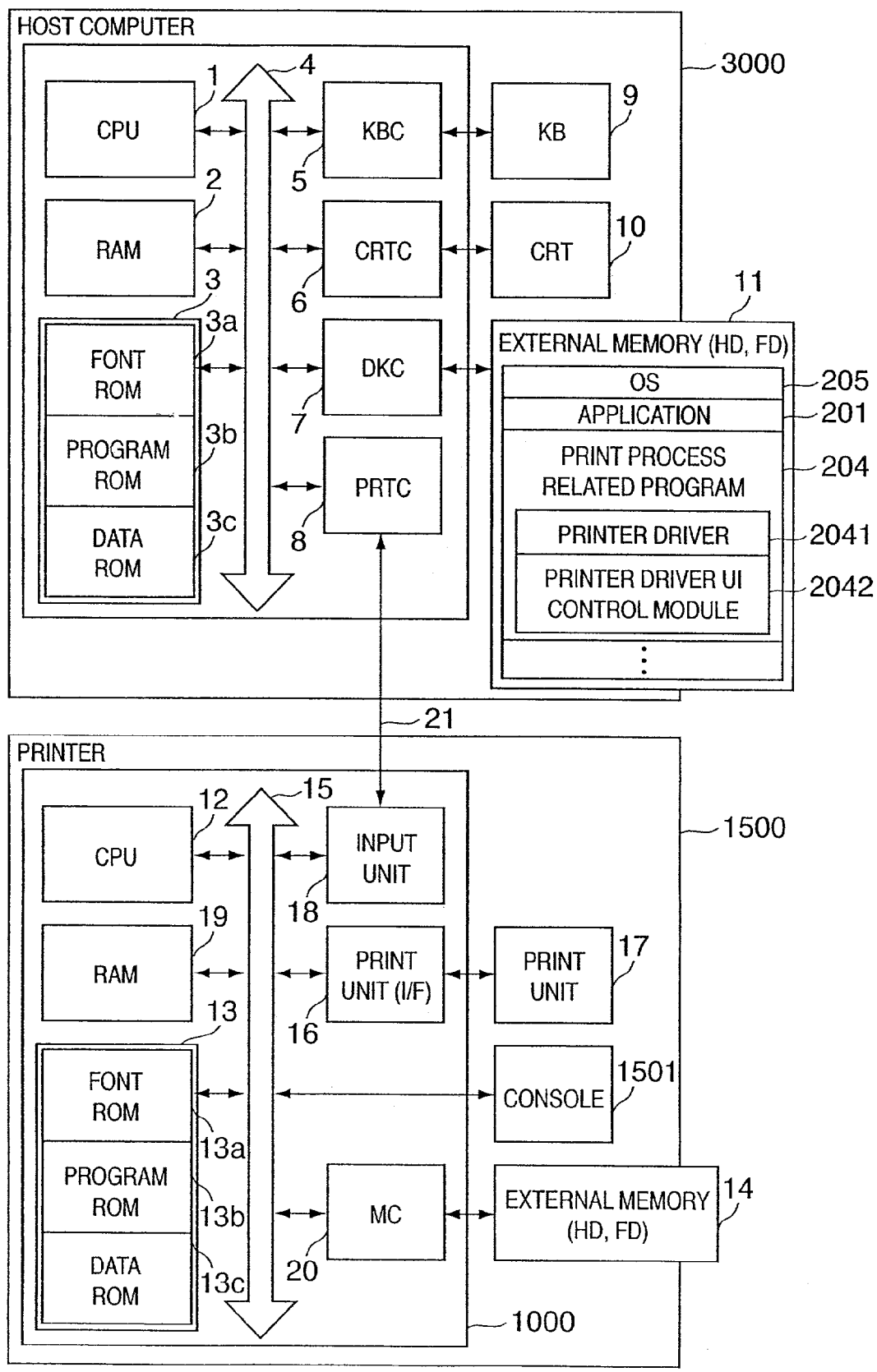
FIG. 1 is a block diagram showing the arrangement of a print processing system according to an embodiment of the present invention.

FIG. 1 is a block diagram showing the arrangement of a print processing system according to an embodiment of the present invention. The print processing system comprises a host computer 3000 and printer 1500.

In the host computer 3000, reference numeral 1 denotes a CPU for systematically controlling respective devices connected to a system bus 4; and 2, a RAM serving as a main memory, work area, and the like of the CPU 1. Reference numeral 3 denotes a ROM for storing various programs and data. The ROM 3 is partitioned into a font ROM 3a for storing various fonts, a program ROM 3b for storing a boot program, BIOS, and the like, and a data ROM 3c for storing various data.

Reference numeral 5 denotes a keyboard controller (KBC) for controlling key inputs from a keyboard 9 and a pointing device (mouse; not shown). Reference numeral 6 denotes a CRT controller (CRTC) for controlling display of a CRT display (CRT) 10.

An external memory 11 (access to which is controlled by a disk controller (DKC) 7) comprises a hard disk (HD), floppy disk (FD), or the like, and stores an operating system program (to be referred to as an OS hereinafter) 205, various applications (for example, a document processing application program for implementing a document process of a document including figures, images, text, tables, and the like together) 201, a print process related program 204, and also user files, edit files, and the like. The print process related program 204 is used to generate print data described using a page description language, and can be commonly used for a plurality of printers of the same series. The print process related program 204 includes a printer control command generation module (to be referred to as a "printer driver" hereinafter) 2041 and printer driver UI control module 2042.

Reference numeral 8 denotes a printer controller (PRTC) which is connected to the printer 1500 via a two-way interface 21 and executes a communication control process with the printer 1500.

The applications stored in the external memory 11 are loaded onto the RAM 2, and are executed by the CPU 1. The CPU 1 also executes a rasterize process of outline fonts on the RAM 2 to obtain a WYSIWYG (What you see is What you get) environment on the CRT 10. Furthermore, the CPU 1 opens various registered windows based on commands designated by, e.g., a mouse cursor (not shown) on the CRT 10, and executes various processes. Upon executing a print process, the user opens a print setup window (controlled by the printer driver UI control module 2042), and can make printer setups and print process setups for the printer driver 2041 as well as selection of a print mode.

In the printer 1500, reference numeral 12 denotes a CPU for controlling the overall printer 1500. Reference numeral 19 denotes a RAM which serves as a main memory, work area, and the like of the CPU 12, and is used as an output information rasterize area, environment data storage area, NVRAM, and the like. The memory size of the RAM 19 can be expanded by an option RAM connected to an expansion port (not shown). Reference numeral 13 denotes a ROM which includes a font ROM 13a for storing various fonts, a program ROM 13b for storing a control program and the like, and a data ROM 13c for storing various data.

An external memory 14 (access to which is controlled by a memory controller (MC) 20) comprises a hard disk (HD), floppy disk (FD), IC card, or the like, which is connected as an option, and stores font data, emulation programs, form data, and the like. When no external memory 14 such as a hard disk or the like is connected, the data ROM 13c of the ROM 13 stores information and the like used by the host computer 3000. Note that the number of external memories 14 is not limited to one, but a plurality of external memories may be connected. For example, a plurality of option font cards in addition to built-in fonts and external memories that store programs for interpreting printer control languages of different language systems may be connected.

A console 1501 has a control panel for accepting user's operations, and operation switches, LED indicators, and the like are arranged on the control panel (not shown). The console 1501 may have an NVRAM (not shown), and may store printer mode setup information input from the control panel.

The printer CPU 12 outputs an image signal as output information to a print unit (printer engine) 17, which is connected to a system bus 15, on the basis of the control program or the like stored in the program ROM 13b in the ROM 13. The CPU 12 can communicate with the host computer 3000 via an input unit 18, and can inform the host computer 3000 of information and the like in the printer 1500.

(Software Configuration)

Figure 2:
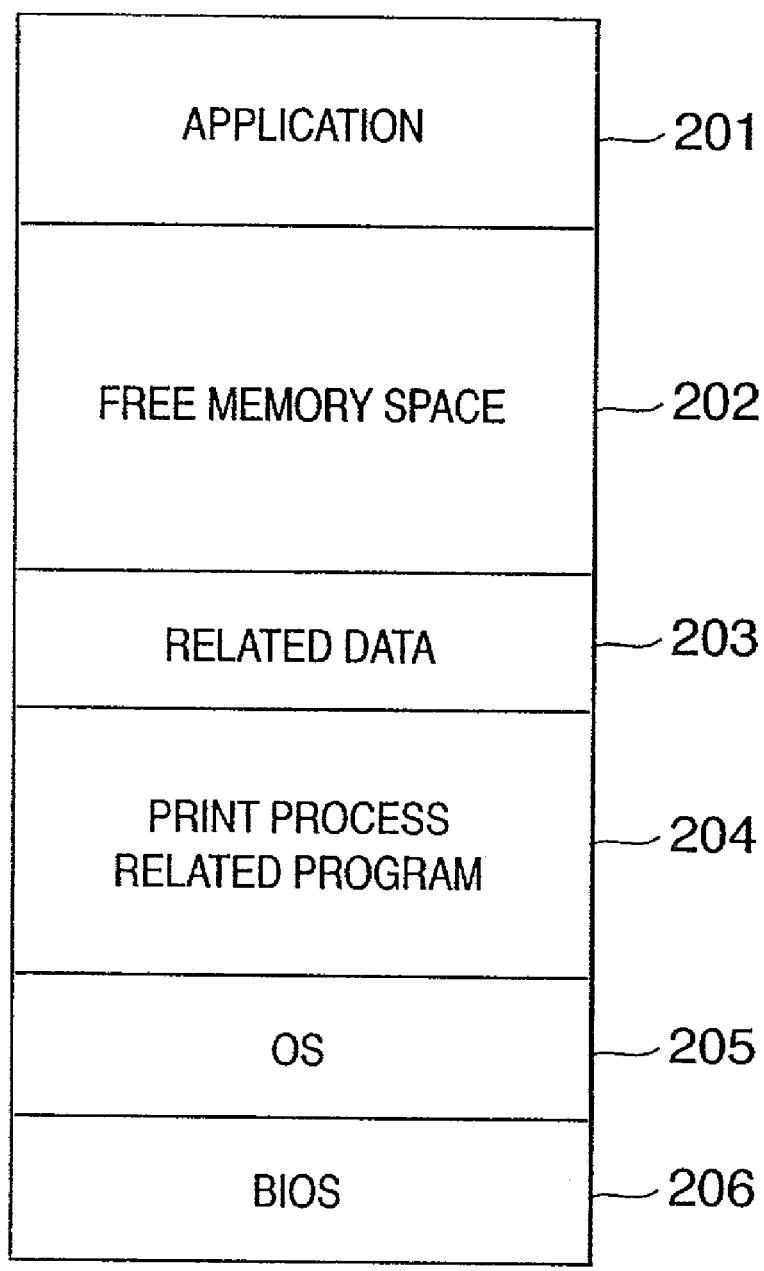
FIG. 2 shows the memory map of a RAM 2 in the embodiment of the present invention.

FIG. 2 shows the memory map of the RAM 2 after a predetermined application and print process related program that controls the printer 1500 are launched and are loaded onto the RAM 2 on the host computer 3000. As shown in FIG. 2, a BIOS 206, OS 205, application 201, print process related program 204, and related data 203 are loaded onto the RAM 2, and a free memory area 202 is also assured. In this way, the application 201 and print process related program 204 are ready to run.

The printer driver UI control module 2042 in the print process related program 204 displays a print setup window on the CRT 10 in response to a print setup command input by the user, and allows user's setups.

Figure 8:
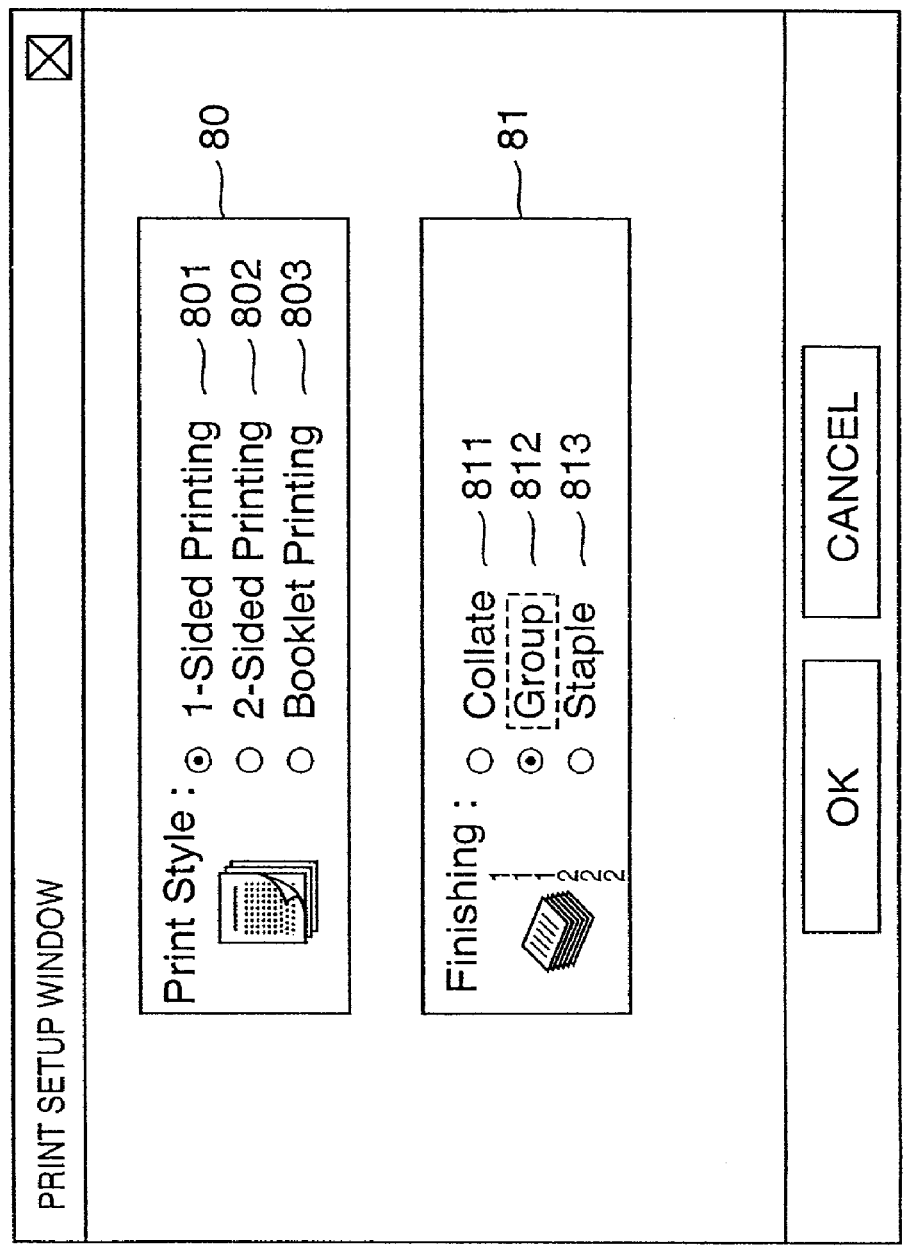
FIG. 8 shows an example of a print setup window by the printer driver UI in the first embodiment of the present invention.

FIG. 8 shows a display example of the print setup window as a UI. Referring to FIG. 8, a [Print Style] column 800 is used to designate a print layout, and the user can designate a control of one of, e.g., 1-Sided Printing 801, 2-Sided printing 802, and Booklet Printing 803 by clicking a corresponding radio button using the mouse.

A [Finishing] column 81 is used to designate the output order of printed print media, and finishing, and the user can designate one of the following items.

[Collate] 811:

copy set printing. When M copies of a document including N pages are to be printed, the document is output sheet by sheet in the order of the first page, second page, . . . , N-th page, and this process is repeated M times.

[Group] 812:

page unit printing. When M copies of a document including N pages are to be printed, the document is output in the order of M first pages, M second pages, . . . , and M N-th pages.

[Staple] 813:

staple finishing. The document is output in units of sets like in [Collate] 811, and output sheets are stapled by a stapler for respective copy sets as finishing.

In this specification, the aforementioned user settable items will be referred to as "printer functions" or "functions" simply. Many other printer functions are available, but a description thereof will be omitted for the sake of simplicity.

Note that the printer driver UI control module 2042 is designed to avoid setup combinations disadvantageous for the user and insignificant setup combinations, i.e., conflicts between setup values, by conflict resolution (to be described in detail below).

Figure 3:
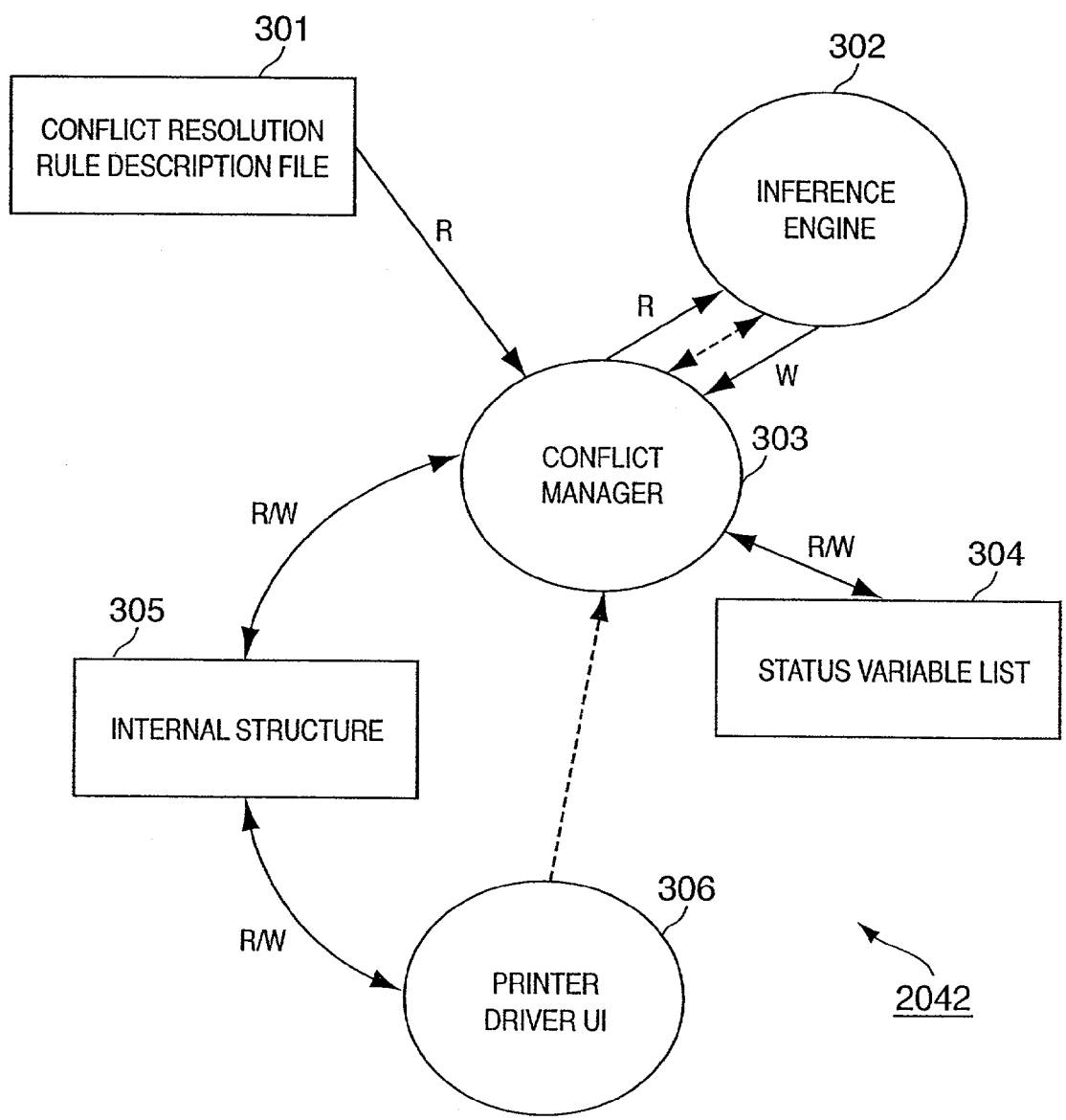
FIG. 3 is a schematic diagram of a printer driver UI control module in the embodiment of the present invention.

FIG. 3 shows a schematic configuration of the printer driver UI control module 2042 in the print process related program 204 in this embodiment. Reference numeral 303 denotes a conflict manager for managing exchanges of data among modules, update of data, and the like to control the conflict resolution. Reference numeral 306 denotes a printer driver UI which makes the aforementioned print setup window display control and is a main program in this printer driver UI control module 2042. Reference numeral 301 denotes a conflict resolution rule description file that enlists conflict resolution rules described in a description format to be described later. Reference numeral 302 denotes an inference engine for applying conflict resolution rules to input setup values and inferring the states of respective functions by loading the conflict resolution rule description file 301; and 304, a status variable list that displays the states of respective printer functions in the form of a list, and can be updated on the basis of user's inputs and the contents of the conflict resolution rule description file 301. Reference numeral 305 denotes an internal structure as a slip which becomes a source of window display provided by the printer driver UI 306. The internal structure 305 displays the status values of respective printer functions in a predetermined format in collaboration with the status variable list 304.

Upon receiving user's setup information via the printer driver UI 306, the conflict manager 303 refers to the conflict resolution rule description file 301. This process is indicated as "R (Read)" by an arrow from the conflict resolution rule description file 301 toward the conflict manager 303, as shown in FIG. 3. When the setup information matches a given conflict resolution rule as a result of reference, the conflict resolution is applied. In this way, the conflict manager 303 updates the status variable list 304 and internal structure 305, and reflects the updated contents in the printer driver UI 306. This update process is indicated as "R/W (Read/Write)" by double-headed arrows that connect the conflict manager 303 to the status variable list 304 and internal structure 305, as shown in FIG. 3.

Figure 4:
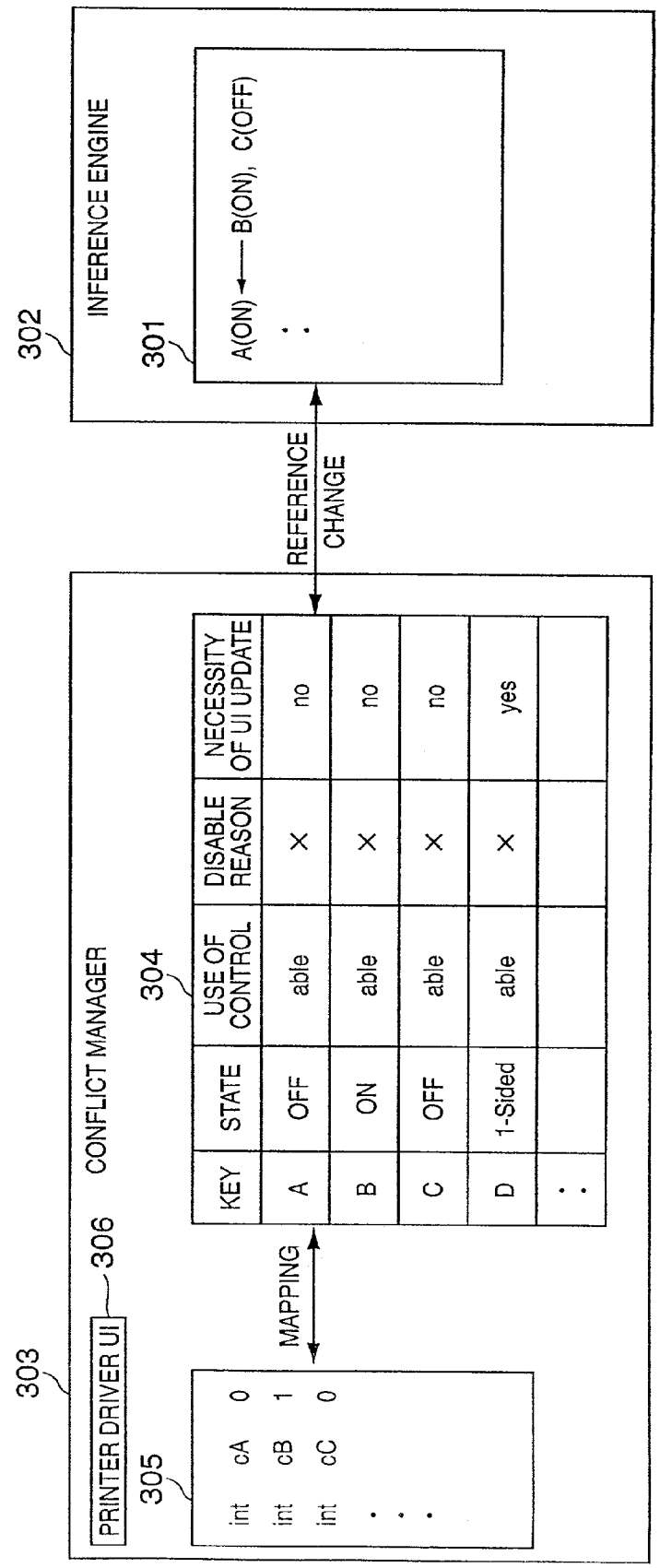
FIG. 4 is a view for explaining the relationship among data handled by the printer driver UI control module in the embodiment of the present invention.

FIG. 4 is a view for explaining the relationship among data handled by the respective modules shown in FIG. 3. Referring to FIG. 4, the conflict resolution rule description file 301 is referred to while being included (loaded) in the inference engine 302. The conflict resolution rule description file 301 is also referred to by the conflict manager 303, and the status variable list 304 is updated to have contents according to the conflict resolution rules. Since the internal structure 305 and status variable list 304 are displayed in association with each other, as described above, they are mapped to each other. This state is expressed by the printer driver UI 306 in a form visible to the user.

The status variable list 304 will be described in detail below. As shown in FIG. 4, the list 304 describes useable/disable information of a corresponding control, reason (disable reason) information when the use of the corresponding control is disabled, UI update necessity/unnecessity information, and the like in addition to status values in correspondence with printer functions (A, B, C, . . . in a column "key" in FIG. 4).

The internal structure 305 expresses the state of each printer function using a syntax:

data type function name member status member and expresses function name members corresponding to printer function names A, B, and C by cA, cB, and cC, respectively. The status members corresponding to respective functions are mapped with status values in the status variable list 304.

(Description Format of Conflict Resolution Rules)

The conflict resolution rule description file 301 will be described below.

Rules are mathematically formulated using logic. A predicate is described in the form of:

printer function name(argument)

As the argument, a numerical value (for example, the number of copies to be printed or the like) may be used in addition to ON/OFF. Printer function name(argument) is described on the left-hand side, a logic condition for establishing the left-hand side is described on the right-hand side, and they are related using symbol "←". For example,

A(ON)←B(ON).

is a rule which means that "when the state of printer function B is ON, the state of printer function A is set ON".

Symbol "," in a formula is used to mean logic "AND". For example, a rule "when the state of printer function B is ON and the state of printer function C is OFF, the state of printer function A is set ON" is described by:

A(ON)←B(ON), C(OFF).

Furthermore, the conflict resolution rule description file 301 can describe a process for updating the printer driver UI 306. The inference engine 302 can directly execute an update process of the printer drive UI 306 via the status variable list 304 of the conflict manager 303 when it interprets that description.

For example, by adding a description of a {disable} set as a UI update process, a process for disabling a control of a corresponding item (a process for graying out that item to deny any setup change) can be instructed.

By adding a description of a {Reason(X)} set after the {disable} set, a message corresponding to a reason identifier X used to display a disable reason can be displayed (to be described in detail later).

Examples of function names described in the conflict resolution rules will be described below taking the printer functions displayed in FIG. 8 as an example. A copy set print function corresponding to [Collate] 811, page unit print function corresponding to [Group] 812, and staple finishing function corresponding to [Staple] 813 shown in FIG. 8 are respectively expressed by Collate( ), Group( ), and Staple( ), and the argument is ON or OFF. A print layout function corresponding to the [Print Style] column 80 is expressed by Layout( ), and an argument is one of 1-Sided, 2-Sided, and Booklet.

In addition, functions which are not directly related to the UI (e.g., the mounted state of a specific option, environmental information indicating an attribute such as the type of set print sheets or the like) can be defined. For example, Finisher( ) which indicates whether or not a staple finisher as a device option is mounted can be used. The argument is ON or OFF. Finisher(ON) indicates the state wherein the finisher is mounted; Finisher(OFF) indicates the state wherein the finisher is not mounted.

Also, StaplablePaper( ) indicating whether or not set print sheets are staplable paper sheets can be used. The argument is ON or OFF. StaplablePaper(ON) indicates the state wherein staplable paper sheets are set; StaplablePaper(OFF) indicates the state wherein staplable paper sheets are not set.

Note that the aforementioned function names are examples for a specific object to be controlled, i.e., the printer, and other function names can be defined in correspondence with an object to be controlled.

FIG. 6 shows an example of the conflict resolution rule description file 301 described according to the aforementioned example.

(1) indicates a rule that sets Staple(OFF), e.g., disables staple finishing when no finisher is mounted. Since {disable} is described in the subsequent line, if this rule is applied, control [Staple] 813 is grayed out. Also, {Reason{NO_FINISHER)} is described in the next line. Note that a reason identifier NO_FINISHER indicates that no finisher is mounted.

(2) indicates a rule that sets Staple(OFF) when no staplable print sheets are set. Since {disable} is described in the subsequent line as in (1), if this rule is applied, control [Staple] 813 is grayed out. Also, a {Reason(INVALID_PAPER)} set having a reason identifier INVALID_PAPER, which indicates that unstaplable paper sheets are set, is described in the next line.

(3) indicates a rule that sets Staple(OFF) when Layout (BOOKLET) is set since the user checks [Booklet Printing] 803. Likewise, if this rule is applied, control [Staple] 813 is grayed out by a description of {disable}. Also, a {Reason (INVALID_LAYOUT)} set having a reason identifier INVALID_LAYOUT, which indicates that an invalid print style (layout) is designated, is set in the next line.

(4) indicates a rule that sets Staple(OFF) when an OHP sheet is set as a print medium. If this rule is applied, control [Staple] 813 is grayed out by a description of [disable]. Also, a {Reason(INVALID_PAPERTYPE)} set having a reason identifier INVALID_PAPERTYPE, which indicates that an invalid paper style is designated, is set in the next line.

(5) indicates a rule that sets Staple(OFF) when Collate (ON) is set since the user checks [Collate] 811, and (6) indicates a rule that sets Staple(OFF) when Group(ON) is set since the user checks [Group] 812.

(7) indicates a rule that sets Collate(ON) when Layout (BOOKLET) is set since the user checks [Booklet Printing] 803. If this rule is applied, control [Collate] 811 is grayed out by {disable} described in the next line.

(8) indicates a rule that sets Group(OFF) when Layout (BOOKLET) is set since the user checks [Booklet Printing] 803. If this rule is applied, control [Group] 812 is grayed out by {disable} described in the next line.

In this way, rules to be applied depending on the states of the respective functions are described.

(Processing Contents of Printer Drive UI Control Module 2042)

The process of the printer driver UI control module 2042 including the conflict resolution will be described in detail below using the flow chart in FIG. 5.

The process of the printer driver UI control module 2042 starts when the user instructs to open the print setup window using, e.g., the keyboard controller KBC 5 or the like. When the user instructs to open the print setup window, the print process related program 204 is loaded onto the RAM 2 under the control of the OS 205.

When the print process related program 204 is loaded onto the RAM 2, the inference engine 302 loads the conflict resolution rule description file 301 onto the RAM 2 via the conflict manager 303 as an initialization process for opening the print setup window (step S501).

Subsequently, the status variable list 304 used by the conflict manager 303 is generated (step S503).

All printer function names described in the conflict resolution rule generation file 301 respectively have status variables in the status variable list 304 included in the conflict manager 303. These status variable values link with the values of corresponding members of the internal structure 305 used by the printer driver UI 306. The initial values of the status variables of the respective function names become the values of the members of the internal structure 305.

For example, in FIG. 4, since the initial value of int cA described in the internal structure 305 is 0, the value of printer function A in the status variable list 304 corresponding to that value is OFF. Therefore, the initial value of status of printer function A in the status variable list 302 is OFF. Likewise, the initial value of printer function name B is ON, and that of printer function name C is OFF. That is,

A OFF
B ON
C OFF

After that, the inference engine 302 refers to the conflict resolution rule description file 301 to make conflict check inference. For example, as shown in FIG. 4, if

A(ON)←B(ON), C(OFF)

described in the conflict resolution rule description file 301 is true, the inference engine 302 changes the status variable value of printer function A in the status variable list 304 from the initial value OFF to ON. That is,

A .ON
B ON
C OFF

In this way, the status variable list 304 is initialized. Also, other items (display/non-display information of a control and the like) in the status variable list 304 are similarly initialized.

Upon completion of conflict check inference, the conflict manager 303 reflects the changed status variable value in corresponding member int cA of the internal structure 305. That is, since the above rule is true, int cA is changed from 0 to 1.

A practical initialization process upon opening the UI shown in FIG. 8 will be exemplified below. FIG. 7 shows an example of the internal structure for the UI shown in FIG. 8. As can be seen from FIG. 7, status members corresponding to function name members Layout, Collate, Group, and Staple are respectively 1Sided, 0, 1, and 0. From this state, conflict check is done with reference to the conflict resolution rule description file 301 shown in FIG. 6. If the contents of the internal structure are in the state shown in FIG. 7, none of the rules in the conflict resolution rule description file 301 shown in FIG. 6 are applied. That is, the status variable values of the above function names have the following initial values as a result of initialization in step S503:

Collate OFF
Group ON
Staple OFF
Layout 1-Sided

Subsequently, another initialization process required to open the UI is executed, and the UI exemplified in FIG. 8 is opened (step S504). In this case, values according to the setup values are displayed, and a process (change able/disable) according to the use able/disable information of a control or the like is executed with reference to the status variable list 304.

After the print setup window as the UI is opened, an event sent from the OS is acquired, and a process for that event is repeated (step S505).

It is then checked if an event acquired in step S505 is one generated when the user has changed a setup item on the print setup window (step S506). If the acquired event is a user's setup change request, the flow advances to step S507 to apply conflict resolution rules with reference to the conflict resolution rule description file 301.

A case will be described as an example of a process executed when the acquired event is a user's setup change request wherein the user has changed 1-Sided Printing 801 to Booklet Printing 803 in the [Print Style] column 80 shown in FIG. 8. In this case, assume that a finisher that can make staple finishing, and paper sheets with a staplable paper size and paper type are set.

Before the setup change request, the status variable values of printer function names Collate, Group, Staple, and Layout were in the state shown in FIG. 7, i.e., as follows:

Collate OFF
Group ON
Staple OFF
Layout 1-Sided

Since the user's change request instructs to change Layout from 1-Sided to Booklet, the contents of the status variable of Layout are changed, and the status variable values of the respective printer function names become:

Collate OFF
Group ON
Staple OFF
Layout Booklet

Then, the printer driver UI 306 calls the conflict manager 303, and then calls the inference engine 302 to start conflict check with reference to the conflict resolution rule description file 301 to have Layout as a start point.

The inference engine 302 checks in turn if each rule of the conflict resolution rule description file 301 is to be applied. As described above, in this example, since the finisher that can make staple finishing is mounted, and paper sheets with a staplable paper size and paper type are set, rules (1) and (2) are never applied.

Since rule (3) is applied, a control is disabled, i.e., is grayed out to deny any setup change while Staple remains OFF. Furthermore, as described above, INVALID_LAYOUT indicating that an invalid print style is designated is set as a grayout reason.

Rules (4), (5), and (6) are not applied, but rules (7) and (8) are applied. As a result, the value of Collate is changed from OFF to ON, the value of Group is changed from ON to OFF, and controls are disabled as follows:

Collate ON (disable)
Group OFF (disable)
Staple OFF (disable, Reason=INVALID_LAYOUT)
Layout BOOKLET In some cases, rules that gray out an identical control for different reasons may be repetitively applied. In such case, a reason with higher priority, which is determined in advance, is adopted. In this case, it is determined that rules described earlier in the conflict resolution rule description file 301 have higher priority.

For example, a case will be examined below wherein paper sheets with an unstaplable size are set after the aforementioned example. In this case, rule (2) is applied together with rule (3). According to this embodiment, rule (2) with higher priority is adopted, and INVALID_PAPER indicating that an invalid print sheet is set is set as a grayout reason. The states of respective controls are:

Collate ON (disable)
    Group OFF (disable)
    Staple OFF (disable, Reason=INVALID_PAPER)
    Layout BOOKLET In this manner, application of conflict resolution rules by the inference engine 302 in step S507 ends.

The conflict manager 303 updates the status variable list 304 on the basis of the application result of the conflict resolution rules in step S507 (step S508). That is, the status variable list is updated, as shown in FIG. 11. As can be seen from FIG. 11, the status value of function Staple is changed to OFF, its control is disabled, and its reason identifier INVALID_PAPER is recorded.

Subsequently, the internal structure 305 is updated (step S509). More specifically, an UI update process is executed for a control, whose UI update information is "yes" in the status variable list 304, and that UI update information is changed to "no" after that process. In the above example, since Layout is changed from 1-Sided printing to Booklet Printing, Collate is changed from OFF to ON, Group is changed from ON to OFF, Collate, Group, and Staple are respectively disabled, and the UI in FIG. 8 is updated, as shown in FIG. 9.

Figure 9:
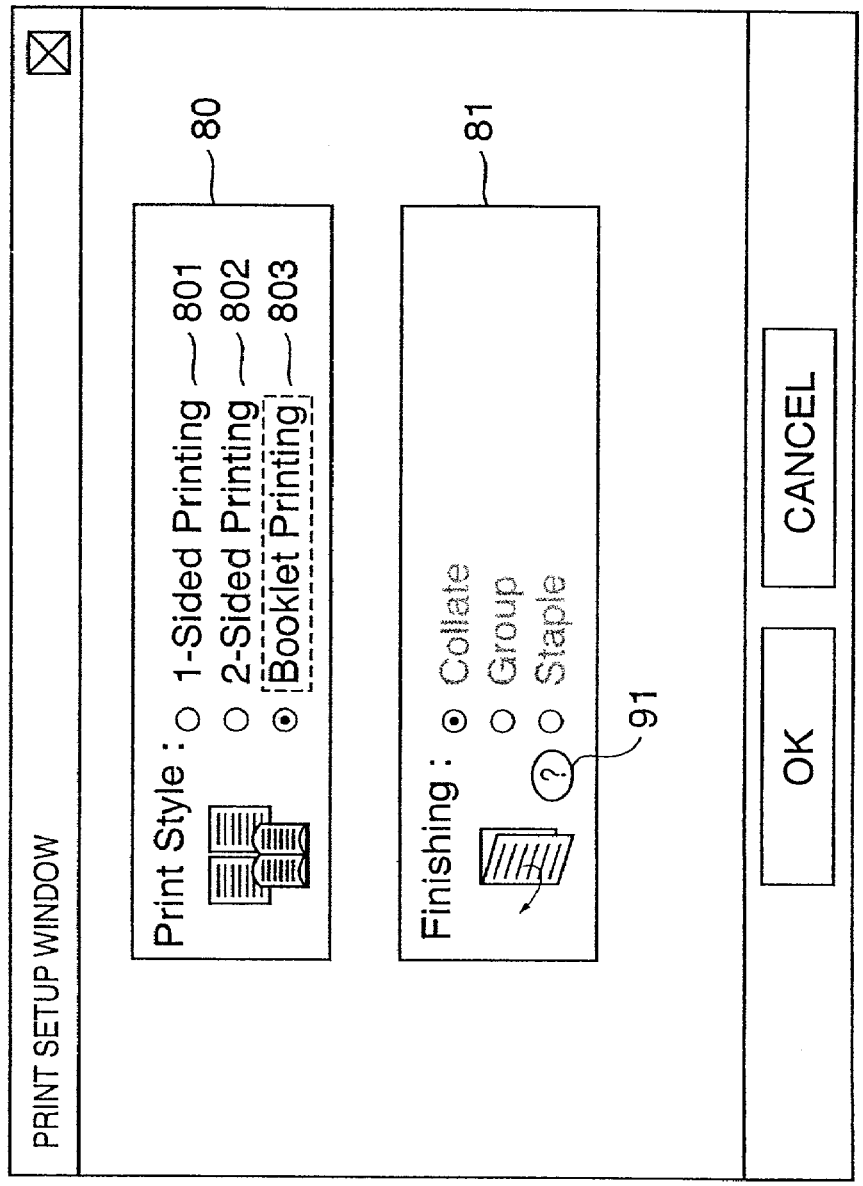
FIG. 9 shows an example of a print setup window by the printer driver UI in the first embodiment of the present invention.

When the controls are grayed out, as shown in FIG. 9, a conflict mark 91 indicating that information is displayed (to be described in detail later). After step S509, the flow returns to step S505 to repeat the process.

If it is determined in step S506 that the event acquired in step S505 is not one generated when the user has changed a setup item on the print setup window, the flow advances to step S512 to check if that event is a grayout reason display event. This event is generated, for example, when user has clicked the conflict mark 91 or has moved the mouse cursor over the conflict mark 91.

Figure 10:
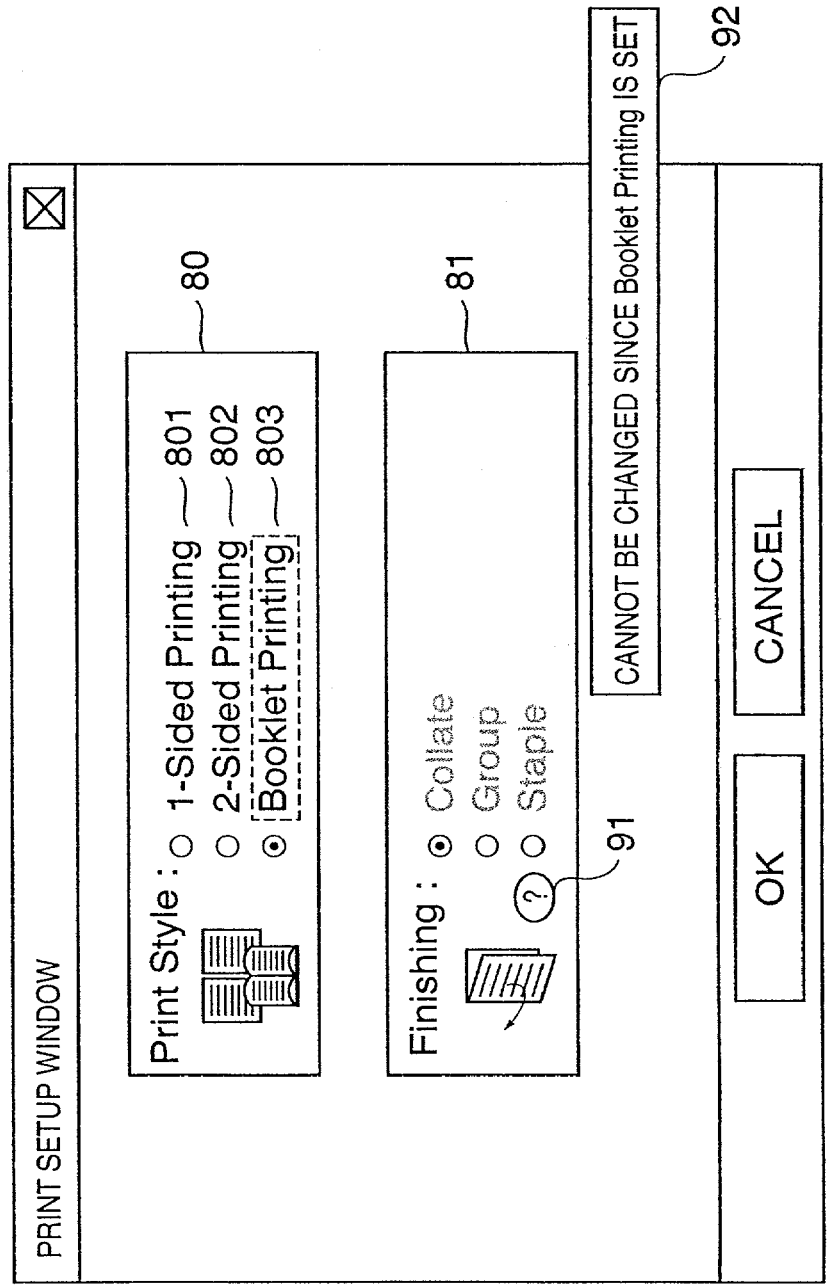
FIG. 10 shows an example of a print setup window by the printer driver UI in the first embodiment of the present invention.

If this event is generated, the flow advances to step S513, and the printer driver UI 306 refers to the status variable list 304 to acquire disable reason information of the corresponding control, and executes a process corresponding to an identifier registered in that information. For example, a comment message 92 shown in FIG. 10 can be displayed. If the event is canceled when the user has pressed any key or has moved the mouse cursor, the message disappears, and the flow returns to step S505 to repeat the process.

It is determined in step S512 that the acquired event is not a reason display event, the flow advances to step S514 to check if the acquired event is a close request of the printer driver UI. If that event is a close request, the internal structure is updated by set status variable values (step S515), and a predetermined end process is executed to close the printer driver UI, thus ending all processes (step S516). If the acquired event is not a close request, the flow returns to step S505 to repeat the process.

The aforementioned process is repeated until the printer driver UI is closed. If the printer driver UI is closed, the process ends, and the processing of the print process related program 204 also ends and is cleared from the RAM 2 by the function of the OS 205.

According to the aforementioned embodiment, when a given control is disabled and is grayed out, the conflict resolution rule description file describes a reason for that grayout control. Hence, grayout reason information can be easily managed. For this reason, the user is free from any troublesome processes for adding dedicated reason detect programs, and cases that cause condition errors and inconsistency, and a high-quality reason display process can be implemented.

Furthermore, according to the embodiment of the present invention, since the reason display process is transplanted from the printer driver UI to the conflict manager, the printer driver UI and conflict manager need not synchronize reason identifiers. Consequently, the independence of the reason display process can be improved, resulting in high productivity and easy maintenance.

Another Embodiment

In the above embodiment, a reason comment is displayed by the printer driver UI 306 in step S513. Alternatively, the comment may be displayed by the conflict manager 303. That is, the conflict manager 303 may have an internal character string resource, and upon generation of a reason display event, the conflict manager 303 may be called to display a corresponding message with reference to the reason attribute of the status variable.

In step S507, only one reason with highest priority is held. Alternatively, all corresponding reasons may be held, and may be displayed in step S513.

In step S507, the priority order is determined by the order in which rules are described. However, the present invention is not limited to such specific order, but another criterion may be set. By applying only rules that change status values, the latest reason can be held, and efficiency can be improved.

Second Embodiment

The second embodiment in which a module for executing conflict resolution for data input via the UI is commonly used by conflict resolution for data input without the intervention of the UI, and by a matching process for overall data will be explained below.

The schematic arrangements of hardware and software in the second embodiment are the same as those in the first embodiment. Therefore, FIGS. 1 to 4 are also used in this embodiment.

Note that the status variable list 304 in FIG. 4 can describe status values, use able/disable information of a corresponding control, reason (disable reason) information when the corresponding control is disabled, UI update necessity/unnecessity information, and the like for respective printer functions (A, B, C, . . . in the column "key" in FIG. 4). However, in practice, a UI display update method, a data acquisition method from the internal structure 305, a data reflection method to the internal structure 305, and the like are described in addition to the above information. Note that "method" means a procedure which describes a data process for implementing a target function.

FIG. 12 shows an example of the conflict resolution rule description file 301 in this embodiment.

(1) indicates a rule that sets Staple(OFF) when Layout (BOOKLET) is set since the user checks [Booklet Printing] 803. Since the next line describes {disable}, if this rule is applied, control [Staple] 813 is grayed out.

(2) indicates a rule that sets Staple(OFF) when Collate (ON) is set since the user checks [Collate] 811, and (3) indicates a rule that sets Staple(OFF) when Group(ON) is set since the user checks [Group] 812.

(4) indicates a rule that sets Collate(ON) when Layout (BOOKLET) is set since the user checks [Booklet Printing] 803. If this rule is applied, control [Collate] 811 is grayed out by {disable} described in the next line.

(5) indicates a rule that sets Group(OFF) when Layout (BOOKLET) is set since the user checks [Booklet Printing] 803. If this rule is applied, control [Group] 812 is grayed out by {disable} described in the next line.

rules to be applied depending on the states of the respective functions are described.

(Processing Contents of Printer Drive UI Control Module 2042)

The process of the printer driver UI control module 2042 of this embodiment will be described in detail below using the flow chart in FIG. 13. This flow chart includes (1) conflict resolution executed when a setup change request is generated via the UI and (2) conflict resolution executed when a setup change request is generated by another application without the intervention of the UI. These processes will be separately described below.

(1) Conflict Resolution Executed When Setup Change Request is Generated via UI

The process of the printer driver UI control module 2042 starts when the user instructs to open the print setup window using, e.g., the keyboard controller KBC 5 or the like. When the user instructs to open the print setup window, the print process related program 204 is loaded onto the RAM 2 under the control of the OS 205.

When the print process related program 204 is loaded onto the RAM 2, the inference engine 302 loads the conflict resolution rule description file 301 onto the RAM 2 via the conflict manager 303 as an initialization process for opening the print setup window (step S1301).

Subsequently, the status variable list 304 used by the conflict manager 303 is generated and initialized (step S1302).

In this step, an area for respective status variables is assured, and methods and flags are set. When initialization is done without opening the UI, initialization that disables a UI update method, holds a UI non-open flag, and so forth is made.

All printer function names described in the conflict resolution rule generation file 301 respectively have status variables in the status variable list 304 included in the conflict manager 303. These status variable values link with the values of corresponding members of the internal structure 305 used by the printer driver UI 306. The initial values of the status variables of the respective function names become the values of the members of the internal structure 305. These member values are acquired via methods, and are set in the status values.

For example, a method of printer A, which is registered in the status variable list 304, refers to int cA, acquires its member value 0, and sets a corresponding status value of printer function A OFF. Likewise, the status value of printer function B is ON, and that of printer function C is OFF. That is,

A OFF
B ON
C OFF

After that, exclusive control of overall setups is made based on a program, and the status value of a printer function corresponding to an item, which cannot be used depending on the setup of another item, is set to be <invalid>. A corresponding control of the item with status <invalid> is grayed out when the UI is displayed, and a setup change request of that item is not accepted when the UI is not displayed.

A practical initialization process upon opening the UI shown in FIG. 8 will be exemplified below. Status variables of printer functions Layout, Collate, Group, and Staple in an internal structure shown in FIG. 14 are prepared, and various methods are set in these variables. A member value is acquired from the setup value in the internal structure via an internal structure acquisition method of each item, and the status variable values are initialized as follows:

Collate OFF
Group ON
Staple OFF
Layout 1-Sided

Then, an item to be disabled is checked, and the status of the status variable of that item is set to be <invalid>. In this example, no items are disabled. In this way, the initialization process of status variables in step S1302 ends.

It is then checked if a UI process is required, i.e., if the UI is displayed (step S1303). In this checking step, a call source may be discriminated, or a dedicated flag may be used. Or the presence/absence of a UI update method of a status variable or a flag in a status variable may be used. If the UI is to be opened, an initialization process required to open the UI is executed, and the UI is opened (step S1304). In this case, display is made according to setup values, and an item with status <invalid> is grayed out.

After the printer driver UI is opened, acquisition of an event sent from the OS and its process are repeated (step S1305). It is then checked if an event acquired in step S1305 is one generated when the user has changed a setup item on the printer driver UI (step S1306). If YES in step S1306, the flow advances to step S1307 to check if the change request is one for a valid item. When the UI is displayed, since the invalid item is grayed out and no input is made from the invalid item, this checking step always succeeds. If it is determined that the change request is one for a valid item, the flow advances to step S1308 to apply conflict resolution rules loaded in step S1301.

A case will be described as an example of a process executed in step S1308 when the acquired event is a user's setup change request wherein the user has changed 1-Sided Printing 801 to Booklet Printing 803 in the [Print Style] column 80 shown in FIG. 8.

Before the setup change request, the status variable values of printer function names Collate, Group, Staple, and Layout were in the state shown in FIG. 14, i.e., as follows:

Collate OFF
Group ON
Staple OFF
Layout 1-SIDED

Since the user's change request instructs to change Layout from 1-Sided to Booklet, the contents of the status variable of Layout are changed, and the status variable values of the respective printer function names become:

Collate OFF
Group ON
Staple OFF
Layout BOOKLET

Then, the printer driver UI 306 calls the conflict manager 303, and then calls the inference engine 302 to start conflict check with reference to the conflict resolution rule description file 301. That is, the inference engine 302 checks in turn if each rule of the conflict resolution rule description file 301 is to be applied.

Since rule (1) is applied first, a control is disabled, i.e., is grayed out to deny any setup change while Staple remains OFF.

Also, rules (4) and (5) are applied to change the value of Collate from OFF to ON and the value of Group from ON to OFF. As a result, respective controls are disabled as follows:

Collate ON (disable)
Group OFF (disable)
Staple OFF (disable)
Layout BOOKLET

In this manner, application of conflict resolution rules by the inference engine 302 is completed, and the status variable list 304 has been updated in step S1308.

It is then checked if a UI process is required (step S1309). If a UI process is required, a UI update process is executed via a UI update method of the status variable of each item for a control that must be updated in step S1310. In this process, a process for updating setup values, a grayout process of an item with status <invalid>, and the like are executed.

Figure 18:
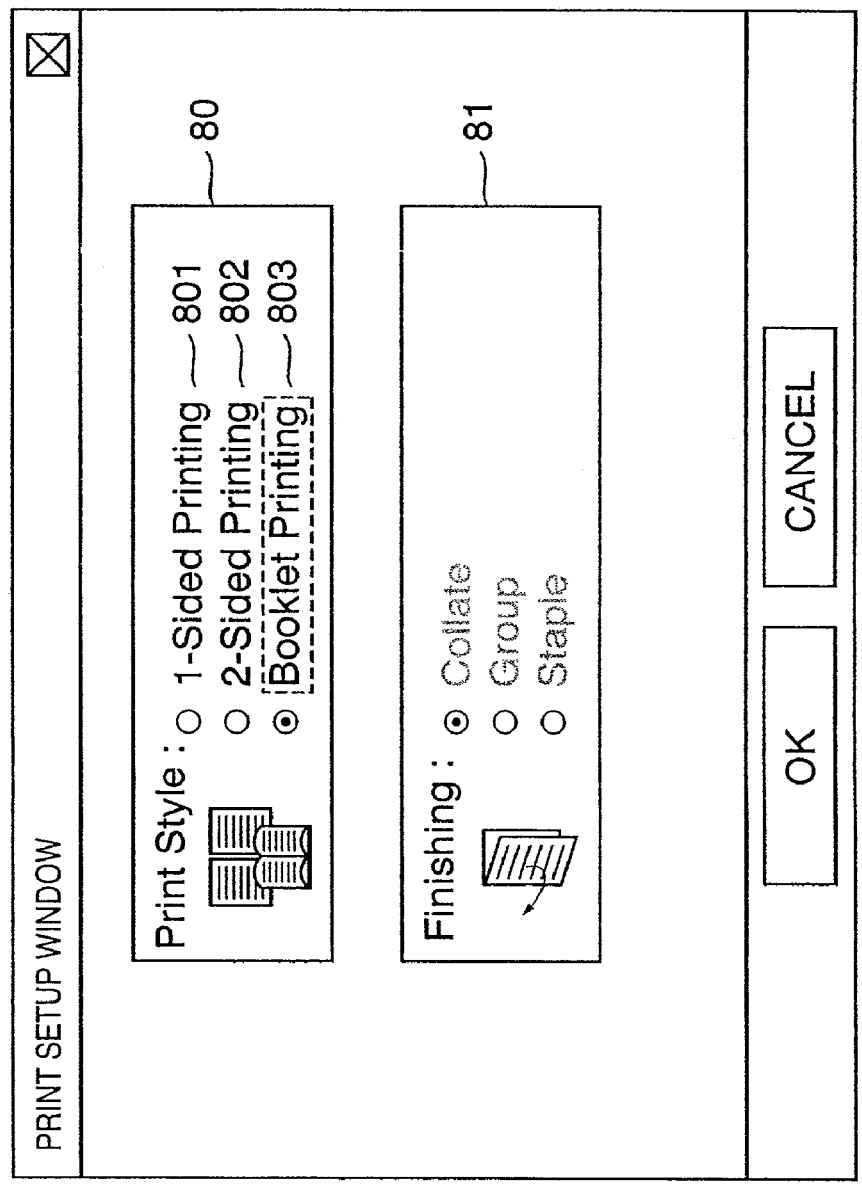
FIG. 18 shows an example of a print setup window by the printer driver UI in the second embodiment of the present invention.

With the above process, since Layout has been changed from 1-Sided Printing to Booklet Printing in the above example, Collate is changed from OFF to ON, Group is changed from ON to OFF, Collate, Group, and Staple are respectively disabled, i.e., grayed out, and the UI shown in FIG. 8 is updated, as shown in FIG. 18. After that, the flow returns to step S1305 to repeat the process.

If it is determined in step S1306 that the acquired event is not a setup change request, the flow advances to step S1311 to check if the acquired event is a UI close request. If that event is a close request, the flow advances to step S1312 and setup values of the status variables are reflected in the internal structure via a method. It is then checked in step S1313 if a UI process is required. If YES in step S1313, the UI is closed in step S1314, thus ending all processes. If it is determined in step S1311 that the acquired event is not a close event, the flow returns to step S1305 to repeat the process.

The aforementioned process is repeated until the UI is closed. If the UI is closed, the process ends, and the processing of the print process related program 204 also ends and is cleared from the RAM 2 by the function of the OS 205.

(2) Conflict Resolution Executed When Setup Change Request is Generated by Another Application Without the Intervention of UI The process starts in response to a setup change request received from another application in place of opening the UI. The structure in this case is substantially the same as that upon opening the UI in the aforementioned example (1), except that the printer driver UI 306 has a function of an interface that accepts a request from another application. As in the process upon displaying the UI, the conflict manager 303 is launched, and the conflict resolution rule description file 301 is loaded (step S1301).

In step S1302, the status variable list 304 is generated and initialized. However, in this case, since UI display is not required, no UI update method is necessary. Also, a UI non-display flag may be set if necessary. Initialization of setup values and exclusive control for overall setups are the same as those upon displaying the UI. Note that an item set with status <invalid) does not accept any change request, and has the same effect as that of a grayed-out item on the UI, which does not accept any change request. In this way, the same status variable list as that upon displaying the UI is completed.

It is then checked in step S1303 if a UI process is required. However, in this example, since the UI is not displayed, the UI open process in step S1304 is skipped, and the flow advances to step S1305.

In step S1305, acquisition of an event sent from the OS and its process are repeated. When the UI is displayed, user's UI operation is passed as an event via the OS. When the UI is not displayed, a request from another application is passed as an event. It is checked if the event acquired in step S1305 is a setup change request, i.e., a combination of an item and setup value (step S1306). If YES in step S1306, the flow advances to step S1307 to check with reference to the status of the corresponding status variable if that item is valid.

If it is determined that the item is invalid, this means that the item is equivalent to the control to be grayed out when the UI is displayed. Hence, the change request is discarded, and the flow returns to step S1305. On the other hand, if it is determined that the item is valid, conflict resolution is launched to have that change request item as a start point, and executes the same process as that upon displaying the UI to update the status variables (step S1308). Since NO is determined in the next step S1309 (to check if a UI process is required), the flow returns to step S1305 without executing the UI update process in step S1310.

In this manner, while the printer driver 2041 and conflict manager 303 are running, the processes in steps S1305 to S1310 are repeated as long as a setup change request is received from another application. If an end request event is received (step S1311), when no more change request items remain, the internal structure 305 is updated in the same manner as that when the UI is displayed (step S1312). In this example, since NO is determined in step S1313 (UI display checking step), the UI close process in step S1314 is skipped.

According to the aforementioned process, the same internal structure as that obtained when the UI is opened and setups are changed on the UI can be obtained.

Figure 13:
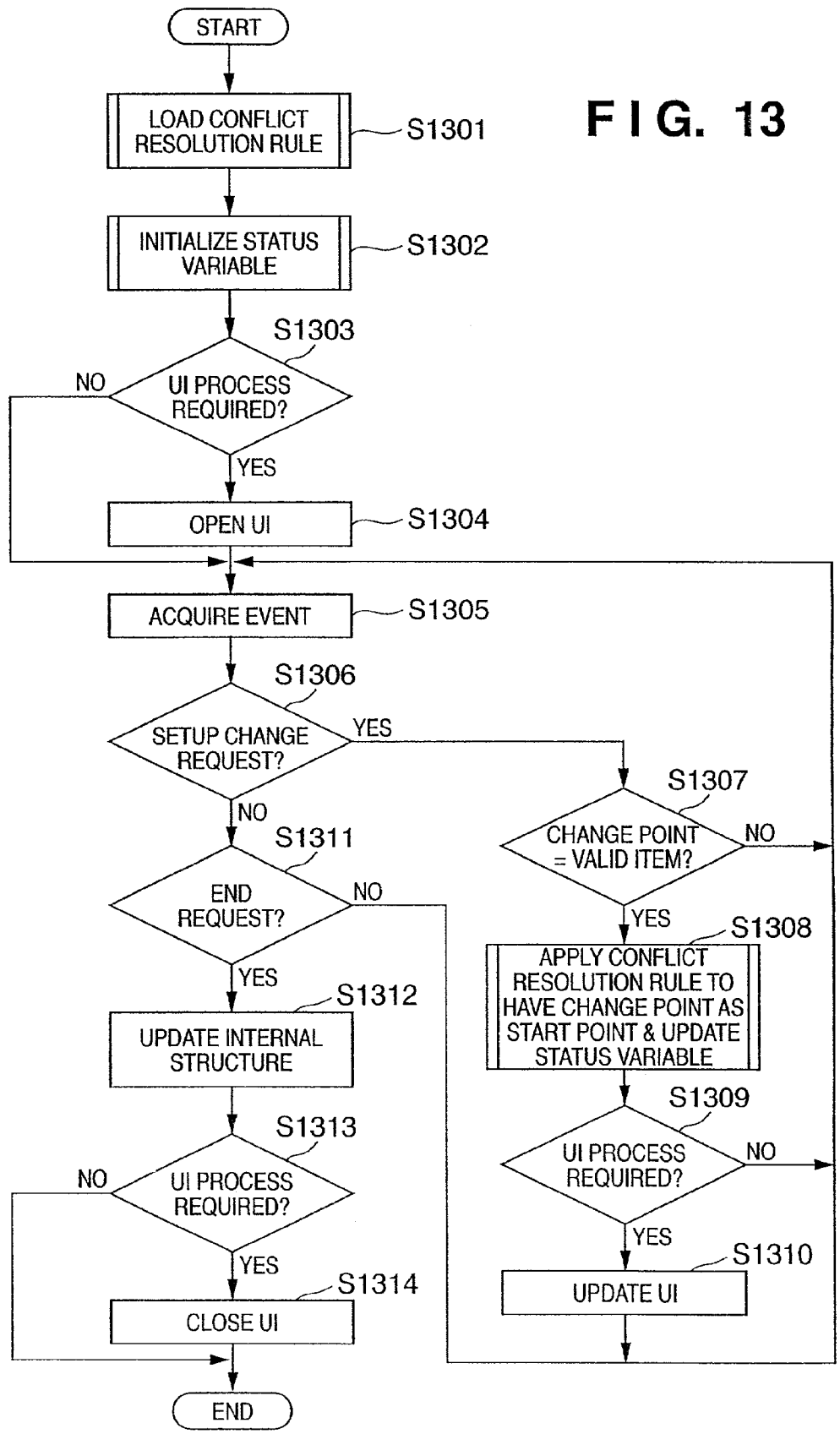
FIG. 13 is a flow chart showing the process of the printer driver UI control module in the second embodiment of the present invention.

In step S1302 in FIG. 13, after the methods and setup values are set, status check is done by the program. An example wherein the conflict resolution rules are also applied in this step will be described using the flow chart shown in FIG. 15.

Figure 17:
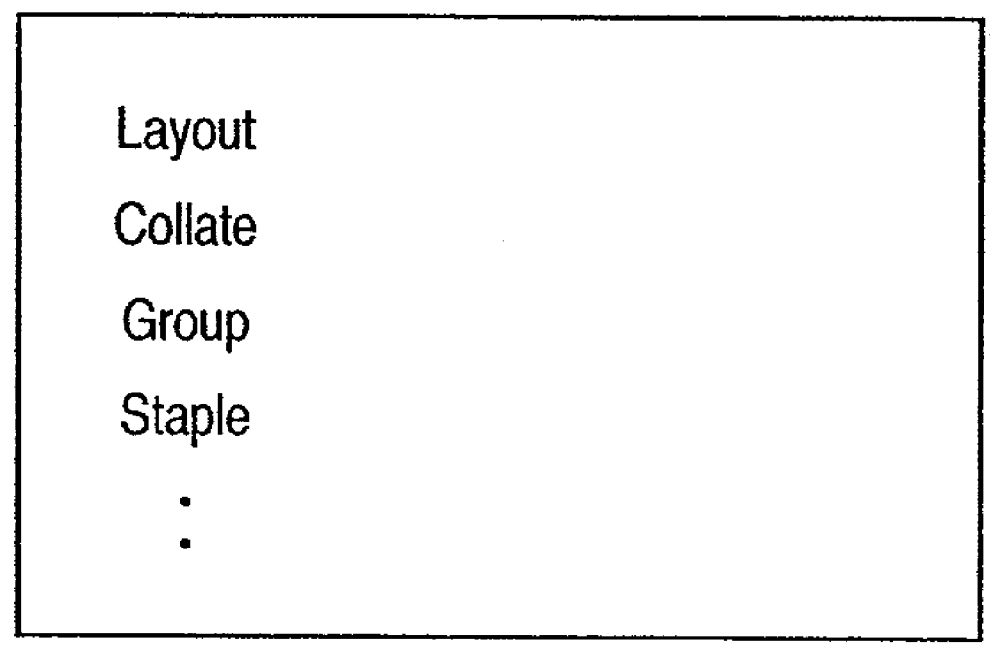

In this example, the initial state of the internal structure 305 is as shown in FIG. 16, and a start point list shown in FIG. 17 and the conflict resolution rules shown in FIG. 12 are used in addition to this internal structure.

As an initial setup process of status variables, a series of processes for assuring a status variable area on the free area 202 (see FIG. 2) on the RAM 2, setting a method, and acquiring initial values from the internal structure 305 via the method are executed (step S1501). As a result, the status variables are initialized as follows:

Collate ON
Group OFF
Staple OFF
Layout BOOKLET

The start point list shown in FIG. 17 is loaded (step S1502), Layout as the first item is acquired, and [Layout, BOOKLET] as a combination of the first item and its setup value BOOKLET is defined as the first start point (step S1503). Initially, the status of that item serving as the start point is evaluated (step S1504). If that item is valid, conflict resolution starts, and conflict resolution rules are applied to have the setup change request as a start point. As a rule which has that start point on the right-hand side, rule (1) in FIG. 12 is applied first to change Staple=OFF and status=disable. Likewise, rules (4) and (5) are applied, and the status variables are updated as follows:
Collate ON (disable)
Group OFF (disable)
Staple OFF (disable)
Layout BOOKLET In this manner, the conflict resolution for Layout in the start point list ends. If it is determined in step S1504 that the item is invalid, the conflict resolution in step S1505 is skipped.

Subsequently, Collate as the next item in the start point list is acquired, and a combination [Collate, ON] with the setup value of collate is set as the next start point (step S1506). Via the step of checking the presence/absence of the start point (step S1507), the flow returns to step S1504. In step S1504, status check of the next start point Collate is made. In this case, since rule (4) has been applied, status of Collate has been changed to disable, and its change request is discarded.

Likewise, Group and Staple in the start point list are processed in turn, and the process ends when it is determined in step S1507 that the process is completed for all items in the start point list. With the processes executed so far, the status variables are initialized as follows:
Collate ON (disable)
Group OFF (disable)
Staple OFF (disable)
Layout BOOKLET and removal of conflicts and initialization of status values are complete.

As described above, status check of all the status variables is done by listing up all items having exclusive relationships with other items of those to be displayed on the UI. Since the items are described in the start point list in descending order of priority, items having dependence can be processed. Also, conflict check of an item which is disabled during the process is skipped, thus improving the process efficiency.

In the above embodiment, the internal structure is updated in step S1312 upon completion of the process. However, the update timing is not limited to such specific timing. For example, the internal structure may be updated after step S1308 every time the status variable is changed.

In the above embodiment, a set of an item and setup value is used as a start point in step S1503. Alternatively, an item alone may be used as a start point, and a process may be executed after the conflict manager provides a corresponding setup value.

Figure 15:
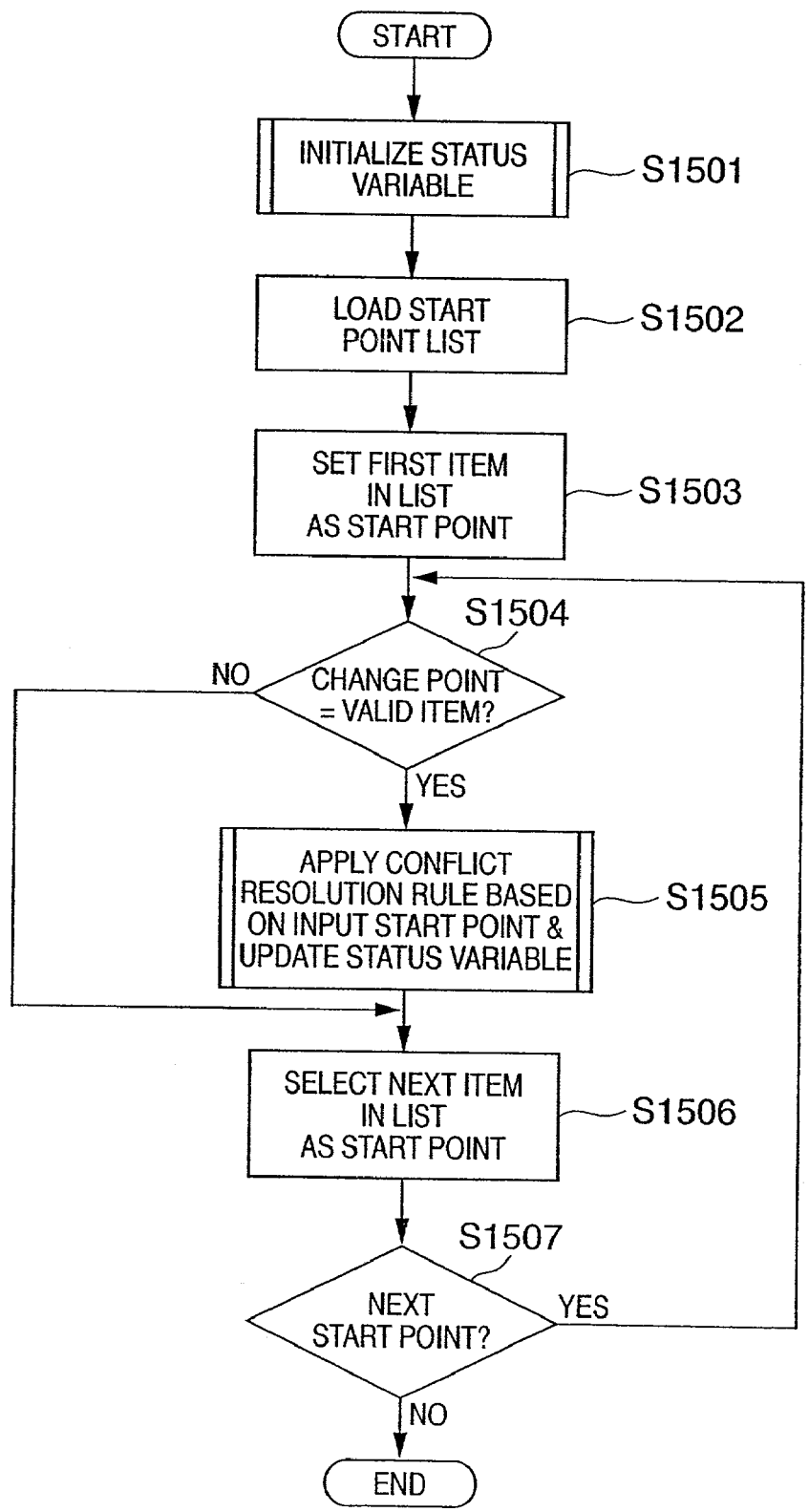
FIG. 15 is a flow chart showing an example of a conflict resolution rule applying process after a status variable list in the second embodiment of the present invention is created.

The process shown in FIG. 15 has been explained as details of step S1302 in FIG. 13. Alternatively, when the overall process is defined as a combination of steps until initialization of status variables, and steps of writing back values to the internal structure, the matching process for overall data of the internal structure may be simply done without changing setups.

According to the aforementioned embodiment, in a process of updating data input without the intervention of the UI and a process for matching overall data, the conflict resolution of the UI can be used without any modifications. Therefore, the user is free from a troublesome process required to generate dedicated programs for these processes, and problems caused by inconsistent or deficient conditions, thus implementing a low-cost, high-quality matching process.

In the above embodiments, UI control including conflict resolution is executed for a printer. However, the present invention is not limited to the printer, but may be applied to peripheral devices such as a digital camera, digital recorder, image scanner, and the like, control apparatuses, and network related apparatuses such as a modem, router, and the like. Also, the present invention can be applied to a system constructed by a plurality of these apparatuses.

As described above, the objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

Figure 5:
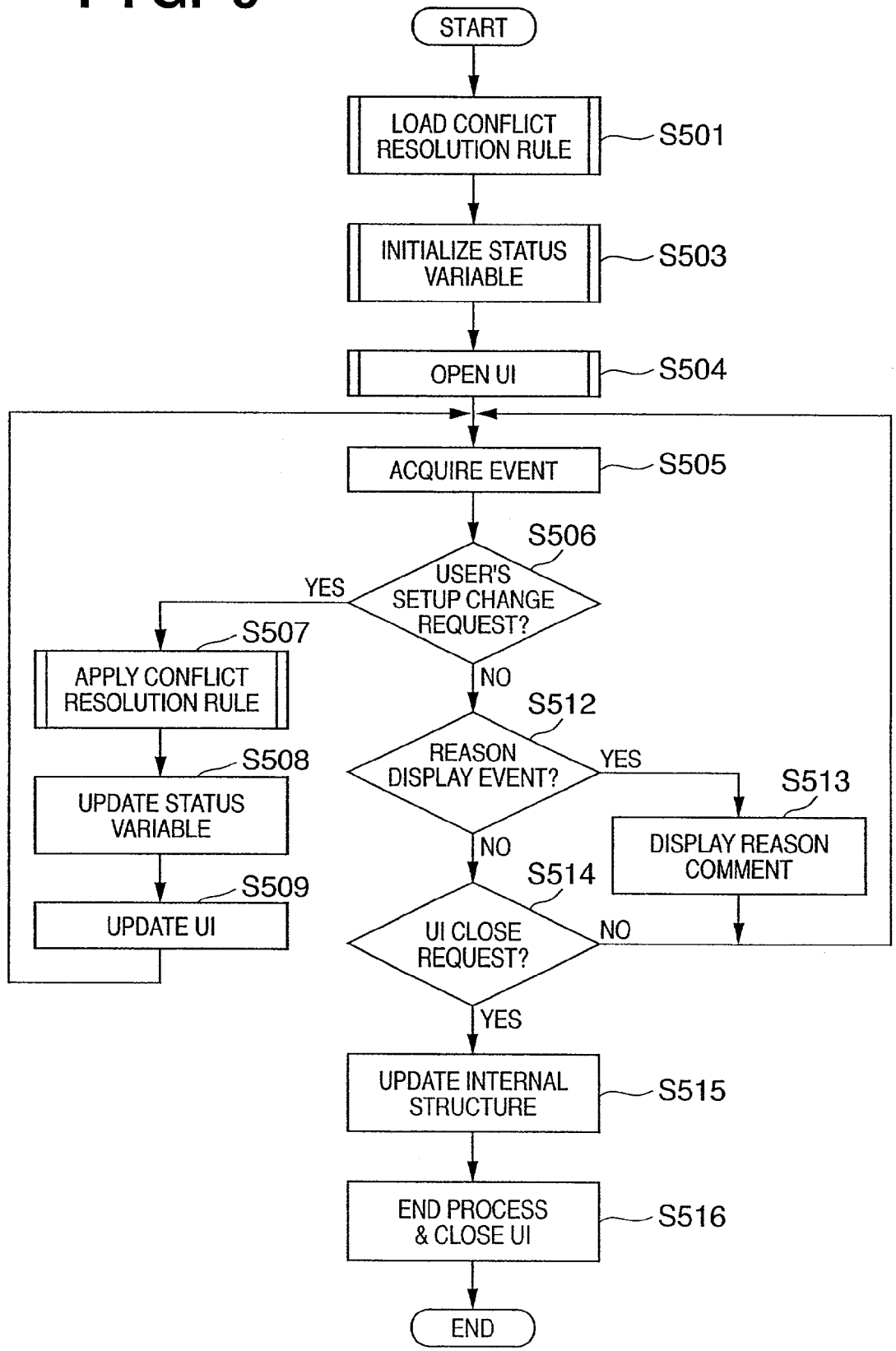
FIG. 5 is a flow chart showing the process of the printer driver UI control module according to the first embodiment of the present invention.

When the present invention is applied to the storage medium, that storage medium stores program codes corresponding to the flow charts shown in FIG. 5, and/or FIG. 13 mentioned above.

As described above, a user interface control apparatus and method which can implement a function of displaying a setup disabled reason of a specific item on the user interface without causing any reason detect errors and inconsistency, and can reduce the number of input steps and human errors by a developer can be provided.

Also, according to the present invention, a low-cost, high-quality user interface control apparatus and method which can commonly use a module which executes conflict resolution for data input via the user interface in conflict resolution for data input without the intervention of the user interface, and a matching process for overall data, and can obviate the need for preparing for dedicated conflict resolution modules for respective processes can be provided.

The present invention is not limited to the above embodiments and various changes and modifications can be made within the spirit and scope of the present invention. Therefore, to apprise the public of the scope of the present invention, the following claims are made.

What is claimed is:

1. A user interface control apparatus for resolving a conflict between a plurality of pieces of setup information input to a predetermined apparatus to be controlled via a user interface and/or a plurality of pieces of environment information of the apparatus to be controlled, comprising:
holding means for holding conflict resolution rules to be applied in accordance with at least one of the setup information and the environment information;
status control means for controlling to enable/disable a direct change in state of a predetermined setup item on the user interface in accordance with the conflict resolution rules; and
message control means for sending a message including a reason why the direct change in state of the predetermined setup item is disabled by said status control means via the user interface, wherein:

the conflict resolution rules include:

a command for disabling the direct change in state of the predetermined setup item; and reason information indicating a reason why the direct change is disabled by the command.

2. The apparatus according to claim 1, wherein said status control means controls to enable/disable the direct change in state of the predetermined setup item on the user interface in accordance with the command included in the conflict resolution rules to be applied in accordance with at least one of the setup information and the environment information.

3. The apparatus according to claim 1, wherein said message control means sends the message according to the reason information included in the applied conflict resolution rule via the user interface.

4. The apparatus according to claim 3, wherein the conflict resolution rules are described and stored in a conflict resolution rule description file, and the conflict resolution rules in the conflict resolution rule description file have a predetermined priority order, and when said status control means repetitively applies a plurality of conflict resolution rules to one setup item, said message control means sends a message corresponding to the reason information included in the conflict resolution rule with the highest priority of the repetitively applied conflict resolution rules via the user interface.

5. The apparatus according to claim 4, wherein the priority order is determined in accordance with an order in which the conflict resolution rules are described in the conflict resolution rule description file.

6. A user interface control method for resolving a conflict between a plurality of pieces of setup information input to a predetermined apparatus to be controlled via a user interface, and/or a plurality of pieces of environment information of the apparatus to be controlled, comprising the steps of:

controlling to enable/disable a direct change in state of a predetermined setup item on the user interface in accordance with conflict resolution rules to be applied in accordance with at least one of the setup information and the environment information, wherein the conflict resolution rules include a command for disabling the direct change in state of the predetermined setup item, and reason information indicating a reason why the direct change is disabled by the command; and sending a message corresponding to the reason information included in the applied conflict resolution rule via the user interface.

7. A control program for resolving a conflict between a plurality of pieces of setup information input to a predetermined apparatus to be controlled via a user interface, and/or a plurality of pieces of environment information of the apparatus to be controlled, executing:

a step of controlling to enable/disable a direct change in state of a predetermined setup item on the user interface in accordance with conflict resolution rules to be applied in accordance with at least one of the setup information and the environment information, wherein the conflict resolution rules include a command for disabling the direct change in state of the predetermined setup item, and reason information indicating a reason why the direct change is disabled by the command; and a step of sending a message according to the reason information included in the applied conflict resolution rule via the user interface.

8. A storage medium that stores a control program for resolving a conflict between a plurality of pieces of setup information input to a predetermined apparatus to be controlled via a user interface, and/or a plurality of pieces of environment information of the apparatus to be controlled, said control program executing:

a step of controlling to enable/disable a direct change in state of a predetermined setup item on the user interface in accordance with conflict resolution rules to be applied in accordance with at least one of the setup information and the environment information, wherein the conflict resolution rules include a command for disabling the direct change in state of the predetermined setup item, and reason information indicating a reason why the direct change is disabled by the command; and a step of sending a message according to the reason information included in the applied conflict resolution rule via the user interface.

9. A user interface control apparatus, which comprises first input means for inputting a setup change request to a predetermined apparatus to be controlled via a user interface, and second input means for inputting a setup change request to the apparatus to be controlled without the intervention of the user interface, and resolves a conflict between setup states of setup items on the user interface, comprising:

a first storage area for storing setup information indicating the setup state of each setup item on the user interface, and information indicating whether or not a direct change of the setup state is enabled;

a second storage area for storing an internal structure of the user interface by reflecting the setup information of each setup item in said first storage area;

a third storage area for storing predetermined conflict resolution rules to be applied to the setup change request input by said first or second input means;

checking means for checking if the information, which indicates whether or not the direct change is enabled, and is stored in said first storage area in correspondence with the setup item to be changed by the setup change request, indicates that the direct change is enabled; and change means for, when said checking means determines that the information, which indicates whether or not the direct change is enabled, and is stored in said first storage area in correspondence with the setup item to be changed by the setup change request, indicates that the direct change is enabled, changing at least one of the setup information and the information indicating whether or not the direct change is enabled, of the specific setup item, which are stored in said first storage area.

10. The apparatus according to claim 9, further comprising:

a fourth storage area for storing a list that describes the setup items associated with the conflict resolution rules; and means for matching setup states of the setup items by applying processes of said checking means and said change means while each setup item in the list is considered as the setup item to be changed by the setup change request.

11. A user interface control method for resolving a conflict between setup states of setup items on a user interface used to set up a predetermined apparatus to be controlled, comprising:

a first input step of inputting a setup change request to the apparatus to be controlled via the user interface;

a second input step of inputting a setup change request to the apparatus to be controlled without the intervention of the user interface;

a checking step of checking if information, which is stored in a status variable list that stores setup information indicating the setup state of each setup item on the user interface, and information indicating whether or not a direct change of the setup state is enabled, corresponds to the setup item to be changed by the setup change request, and indicates whether or not the direct change of the setup state is enabled, indicates that the direct change is enabled; and an update state of updating, when it is determined in the checking step that the information, which corresponds to the setup item to be changed by the setup change request and indicates whether or not the direct change of the setup state is enabled, indicates that the direct change is enabled, at least one of the setup information and the information indicating whether or not the direct change is enabled, of the specific setup item stored in the status variable list in accordance with a conflict resolution rule to be applied according to the setup change request input in the first or second input step.

12. A control program for resolving a conflict between setup states of setup items on a user interface used to set up a predetermined apparatus to be controlled, executing:

a first input step of inputting a setup change request to the apparatus to be controlled via the user interface;

a second input step of inputting a setup change request to the apparatus to be controlled without the intervention of the user interface;

a checking step of checking if information, which is stored in a status variable list that stores setup information indicating the setup state of each setup item on the user interface, and information indicating whether or not a direct change of the setup state is enabled, corresponds to the setup item to be changed by the setup change request, and indicates whether or not the direct change of the setup state is enabled, indicates that the direct change is enabled; and an update state of updating, when it is determined in the checking step that the information, which corresponds to the setup item to be changed by the setup change request and indicates whether or not the direct change of the setup state is enabled, indicates that the direct change is enabled, at least one of the setup information and the information indicating whether or not the direct change is enabled, of the specific setup item stored in the status variable list in accordance with a conflict resolution rule to be applied according to the setup change request input in the first or second input step.

13. A storage medium that stores a control program for resolving a conflict between setup states of setup items on a user interface used to set up a predetermined apparatus to be controlled, said control program executing:

a first input step of inputting a setup change request to the apparatus to be controlled via the user interface;

a second input step of inputting a setup change request to the apparatus to be controlled without the intervention of the user interface;

a checking step of checking if information, which is stored in a status variable list that stores setup information indicating the setup state of each setup item on the user interface, and information indicating whether or not a direct change of the setup state is enabled, corresponds to the setup item to be changed by the setup change request, and indicates whether or not the direct change of the setup state is enabled, indicates that the direct change is enabled; and an update state of updating, when it is determined in the checking step that the information, which corresponds to the setup item to be changed by the setup change request and indicates whether or not the direct change of the setup state is enabled, indicates that the direct change is enabled, at least one of the setup information and the information indicating whether or not the direct change is enabled, of the specific setup item stored in the status variable list in accordance with a conflict resolution rule to be applied according to the setup change request input in the first or second input step.

14. A user interface control apparatus for resolving a conflict between at least two pieces of setup values regarding setup information or environment information of a printing device which are input via a user interface provided by a printer driver which generates printing data to be transferred to the printing device, the apparatus comprising:

determination means for determining whether the setting of a predetermined setup value input via the user interface is enabled or disabled in response to the input of the predetermined setting value; and control means for, if it is determined that the setting of the predetermined setup value is disabled, revoking the input of the predetermined setting value, and providing a message including a reason why the setting of the predetermined setup value is disabled, wherein the conflict resolution rules include:

a command for disabling the setting of the predetermined setup value; and reason information indicating a reason why the setting is disabled by the command.

15. The apparatus according to claim 14, wherein said determination means determines whether the setting of the predetermined setup value is enabled or disabled in accordance with the command included in the conflict resolution rules to be applied in accordance with the at least two pieces of setup values.

16. The apparatus according to claim 14, wherein said control means provides the message according to the reason information included in the applied conflict resolution rule via the user interface.

17. The apparatus according to claim 16, wherein the conflict resolution rules are described and stored in a conflict resolution rule description file, and the conflict resolution rules in the conflict resolution rule description file have a predetermined priority order, and when said determination means repetitively applies a plurality of conflict resolution rules to one setup item, said control means provides a message corresponding to the reason information included in the conflict resolution rule with the highest priority of the repetitively applied conflict resolution rules via the user interface.

18. The apparatus according to claim 17, wherein the priority order is determined in accordance with an order in which the conflict resolution rules are described in the conflict resolution rule description file.

19. A user interface control apparatus, comprising:
conflict resolution means for, in response to a first setting value input via a user interface provided by a printer driver which generates printing data to be transferred to a printing device, resolving a conflict by setting a second setting value already maintained by the printer driver into a value that does not occur a conflict with the first value;
control means for disabling the setting of a control of the second setting value in a state in which the conflict is resolved by said conflict resolution means; and
providing means for providing a message including a reason why the setting of the control is disabled by said control means via the user interface.

20. The apparatus according to claim 19, wherein said providing means includes:
first display means for displaying a mark which indicates that the setting of the control is disabled on the user interface; and
second display means for displaying the message on the user interface in response to obtaining a predetermined event for the mark displayed by said first display means.

21. The apparatus according to claim 19, wherein when a setting value for enabling a booklet printing is input as the first setting value in a state in which a setting value for disabling a collate printing is already set as the second setting value in the printer driver, said conflict resolution means resolves the conflict by changing the second setting value into a value for enabling the collate printing in response to the input of the first setting value, and said control means disables the setting of a control of the collate printing in the state in which the setting value is set in the value for enabling the collate printing.

22. A user interface control method for resolving a conflict between at least two pieces of setup values regarding setup information or environment information of a printing device which are input via a user interface provided by a printer driver which generates printing data to be transferred to the printing device, the method comprising:
a determination step of determining whether the setting of a predetermined setup value input via the user interface is enabled or disabled in response to the input of the predetermined setting value; and
a control step of, if it is determined that the setting of the predetermined setup value is disabled, revoking the input of the predetermined setting value, and providing a message including a reason why the setting of the predetermined setup value is disabled,
wherein the conflict resolution rules include:
a command for disabling the setting of the predetermined setup value; and
reason information indicating a reason why the setting is disabled by the command.

23. The method according to claim 22, wherein said determination step includes determining whether the setting of the predetermined setup value is enabled or disabled in accordance with the command included in the conflict resolution rules to be applied in accordance with the at least two pieces of setup values.

24. The method according to claim 22, wherein said control step includes providing the message according to the reason information included in the applied conflict resolution rule via the user interface.

25. The apparatus according to claim 24, wherein the conflict resolution rules are described and stored in a conflict resolution rule description file, and the conflict resolution rules in the conflict resolution rule description file have a predetermined priority order, and
when said determination step repetitively applies a plurality of conflict resolution rules to one setup item, said control step provides a message corresponding to the reason information included in the conflict resolution rule with the highest priority of the repetitively applied conflict resolution rules via the user interface.

26. The apparatus according to claim 25, wherein the priority order is determined in accordance with an order in which the conflict resolution rules are described in the conflict resolution rule description file.

27. A user interface control method, comprising:
a conflict resolution step of, in response to a first setting value input via a user interface provided by a printer driver which generates printing data to be transferred to a printing device, resolving a conflict by setting a second setting value already maintained by the printer driver into a value that does not occur a conflict with the first value;
a control step of disabling the setting of a control of the second setting value in a state in which the conflict is resolved in said conflict resolution step; and
a providing step of providing a message including a reason why the setting of the control is disabled in said control step via the user interface.

28. The method according to claim 27, wherein said providing step includes:
a first display step of displaying a mark which indicates that the setting of the control is disabled on the user interface; and
a second display step of displaying the message on the user interface in response to obtaining a predetermined event for the mark displayed in said first display step.

29. The method according to claim 27, wherein when a setting value for enabling a booklet printing is input as the first setting value in a state in which a setting value for disabling a collate printing is already set as the second setting value in the printer driver, said conflict resolution step includes resolving the conflict by changing the second setting value into a value for enabling the collate printing in response to the input of the first setting value, and said control step includes disabling the setting of a control of the collate printing in the state in which the setting value is set in the value for enabling the collate printing.

30. A storage medium that stores a control program for resolving a conflict between at least two pieces of setup values regarding setup information or environment information of a printing device which are input via a user interface provided by a printer driver which generates printing data to be transferred to the printing device, the control program executing:
a determination step of determining whether the setting of a predetermined setup value input via the user interface is enabled or disabled in response to the input of the predetermined setting value; and
a control step of, if it is determined that the setting of the predetermined setup value is disabled, revoking the input of the predetermined setting value, and providing a message including a reason why the setting of the predetermined setup value is disabled,
wherein the conflict resolution rules include:
a command for disabling the setting of the predetermined setup value; and
reason information indicating a reason why the setting is disabled by the command.

31. A storage medium that stores a control program, the control program executing:

a conflict resolution step of, in response to a first setting value input via a user interface provided by a printer driver which generates printing data to be transferred to a printing device, resolving a conflict by setting a second setting value already maintained by the printer driver into a value that does not occur a conflict with the first value;

a control step of disabling the setting of a control of the second setting value in a state in which the conflict is resolved in said conflict resolution step; and a providing step of providing a message including a reason why the setting of the control is disabled in said control step via the user interface.

* * * * *